(12) United States Patent
Smith

(10) Patent No.: US 7,755,629 B2
(45) Date of Patent: Jul. 13, 2010

(54) METHOD OF RENDERING GRAPHIC OBJECTS

(75) Inventor: David Christopher Smith, Bridgewater (AU)

(73) Assignee: Canon Kabushiki Kaisha, Tokyo (JP)

( * ) Notice: Subject to any disclaimer, the term of this patent is extended or adjusted under 35 U.S.C. 154(b) by 1347 days.

(21) Appl. No.: 11/156,626

(22) Filed: Jun. 21, 2005

(65) Prior Publication Data

US 2006/0001681 A1    Jan. 5, 2006

(30) Foreign Application Priority Data

Jun. 30, 2004   (AU)   ............................... 2004903592

(51) Int. Cl.
*G06T 11/20* (2006.01)
(52) U.S. Cl. .................. 345/441; 345/442; 345/470
(58) Field of Classification Search .................. 345/441, 345/442, 470
See application file for complete search history.

(56) References Cited

U.S. PATENT DOCUMENTS

| | | | | |
|---|---|---|---|---|
| 5,031,117 A * | 7/1991 | Minor et al. | ................. | 345/606 |
| 5,325,485 A * | 6/1994 | Hochmuth et al. | ........... | 345/505 |
| 5,493,637 A * | 2/1996 | Martin | ......................... | 345/602 |
| 5,600,768 A * | 2/1997 | Andresen | ..................... | 345/629 |
| 5,692,063 A * | 11/1997 | Lee et al. | ..................... | 382/107 |
| 5,757,385 A * | 5/1998 | Narayanaswami et al. | .. | 345/505 |
| 5,767,860 A * | 6/1998 | Zimmer et al. | ............... | 345/441 |
| 5,852,502 A * | 12/1998 | Beckett | ....................... | 358/512 |
| 6,016,150 A * | 1/2000 | Lengyel et al. | .............. | 345/426 |
| 6,104,842 A * | 8/2000 | Rich | ........................... | 382/304 |
| 6,239,807 B1 * | 5/2001 | Bossut | ........................ | 345/582 |
| 6,429,949 B1 * | 8/2002 | Dziesietnik et al. | ........ | 358/1.16 |
| 6,441,817 B1 * | 8/2002 | Gossweiler et al. | ......... | 345/422 |
| 6,501,483 B1 * | 12/2002 | Wong et al. | .................. | 345/611 |

(Continued)

FOREIGN PATENT DOCUMENTS

AU    2003213492    3/2004

(Continued)

OTHER PUBLICATIONS

A survey and performance analysis of software platforms for interactive cluster-based multi-screen rendering Oliver G. Staadt, Justin Walker, Christof Nuber, Bernd Hamann May 2003 EGVE '03: Proceedings of the workshop on Virtual environments 2003 Publisher: ACM.*

(Continued)

*Primary Examiner*—Javid A Amini
(74) *Attorney, Agent, or Firm*—Fitzpatrick, Cella, Harper & Scinto

(57) ABSTRACT

A method of rendering an image described by a list of graphical objects includes the steps of assigning objects in the list to at least one of a first set of objects and a second set of objects, and rendering the first set of objects to an image store using a first rendering method that determines whether a portion of an object of the first set contributes to a rendered output of the first set of objects and, if so, the first rendering method renders each pixel of the portion in sequence. The second set of objects to the image store are rendered using a second rendering method that renders each object in the second set in sequence and independently of the other objects in the second set.

17 Claims, 23 Drawing Sheets

U.S. PATENT DOCUMENTS

| | | | | |
|---|---|---|---|---|
| 6,597,363 | B1* | 7/2003 | Duluk et al. | 345/506 |
| 6,700,580 | B2* | 3/2004 | Lefebvre et al. | 345/506 |
| 6,795,048 | B2* | 9/2004 | Lie | 345/88 |
| 6,891,533 | B1* | 5/2005 | Alcorn et al. | 345/419 |
| 6,891,536 | B2 | 5/2005 | Smith | 345/421 |
| 6,961,067 | B2* | 11/2005 | Moore | 345/589 |
| 7,023,439 | B2* | 4/2006 | Martin et al. | 345/428 |
| 7,084,878 | B2* | 8/2006 | Herceg et al. | 345/555 |
| 7,095,418 | B2* | 8/2006 | Levene et al. | 345/582 |
| 7,190,376 | B1* | 3/2007 | Tonisson | 345/629 |
| 7,274,379 | B2* | 9/2007 | Beaumont | 345/630 |
| 7,286,142 | B2* | 10/2007 | Smith et al. | 345/629 |
| 7,295,342 | B2* | 11/2007 | McElvain | 358/1.9 |
| 7,365,743 | B1* | 4/2008 | Chen et al. | 345/422 |
| 7,379,588 | B2* | 5/2008 | Loce et al. | 382/166 |
| 2003/0016221 | A1* | 1/2003 | Long et al. | 345/441 |
| 2003/0128224 | A1* | 7/2003 | Smith | 345/619 |
| 2003/0179200 | A1* | 9/2003 | Martin et al. | 345/428 |
| 2003/0227463 | A1* | 12/2003 | Smith et al. | 345/582 |
| 2004/0075699 | A1* | 4/2004 | Franchi et al. | 345/860 |
| 2004/0239672 | A1* | 12/2004 | Schmidt | 345/426 |
| 2005/0111694 | A1* | 5/2005 | Loce et al. | 382/100 |
| 2007/0103469 | A1* | 5/2007 | Smith et al. | 345/441 |

FOREIGN PATENT DOCUMENTS

EP    1 351 196    10/2003

OTHER PUBLICATIONS

M.E. Newell, et al., "A Solution to the Hidden Surface Problem", (XP002466484) Proceedings of the AMC National Conference, pp. 443-450 (1972).

* cited by examiner

METHOD OF RENDERING GRAPHIC OBJECTS

FIELD OF THE INVENTION

The present invention relates generally to rendering object-based images. In particular, the present invention relates to a method of rendering graphic objects that uses a plurality of rendering techniques.

BACKGROUND

When a computer application provides data to a device for printing and/or display, an intermediate description of the page is often given to device driver software in a page description language (PDL), which provides descriptions of graphic objects to be rendered onto the page or display. This contrasts with some arrangements where raster image data is generated directly by the application and transmitted for printing or display. Examples of page description languages include Canon's LIPS™ and HP's PCL™.

Equivalently, the application may provide a set of descriptions of graphic objects in function calls to a graphics device interface layer, such as the Microsoft™ Windows GDI. The printer driver for the associated target printer is the software that receives the graphic object descriptions from the GDI layer. For each object, the printer driver is responsible for generating a description of the object in the page description language that is understood by the rendering system of the target printer.

The printer's rendering system contains a PDL interpreter that parses the graphic object descriptions and builds a display list of graphics object data. The rendering system also contains a raster image processor (RIP) that processes the display list and renders the data to pixel values comprising e.g. C, M, Y and K channels. Once in this format, the printer prints the page.

Most RIPs utilize a large volume of memory, known to the art as a framestore or a page buffer, to hold a pixel-based image data representation of the page or screen for subsequent printing and/or display. Typically, the outlines of the graphic objects are calculated, filled with color values and written to the framestore. For two-dimensional graphics, objects that appear in front of other objects are simply written into the framestore after the background objects, thereby replacing the background objects on a pixel by pixel basis. This is commonly known to the art as "Painter's algorithm". Objects are considered in priority order from the rearmost object to the foremost object. Typically each object is rasterised in scanline order and pixels are written to the framestore in sequential runs along each scanline. Some RIPs allow objects to be composited with other objects. For example a logical or arithmetic operation can be specified and performed between one or more graphics objects and the pixels already rendered in the framestore. In these cases, the rendering principle remains the same: objects (or groups of objects) are rasterised in scanline order, and the result of the specified operation is calculated and written to the framestore in sequential runs along each scanline.

There are a number of problems with the Painter's algorithm rendering method. One of the problems is that many pixels which are written to the framestore by rendering an object are over-written when rendering later objects. There is a clear disadvantage in using resources to write pixel data into a framestore that will at a later stage be over-written.

Another problem is that when an object requires compositing, pixels beneath the object are typically read from the framestore and combined in some way with the pixels of the object. If the pixels in the framestore are stored in a lower bit-depth than the object requiring compositing, then most compositing operations generate an incorrect result. This is the case when the graphics object is, for example, an 8 bit per channel RGBA bitmap and the framestore holds one bit per channel half-toned pixel data. This can occur because pixel values are often stored in a framestore at the bit depth required for printing. Although it is possible to store pixels at the full 8 bits per channel, an 8 bit per channel RGBA framestore at 600 dpi resolution requires over 100 MB of memory for an A4 page. Also, once the page is rendered to the 8 bit per channel framestore, it must still be converted to the lower bit depth for printing, which is inefficient.

Other RIPs utilize a pixel-sequential rendering method to remove the need for a framestore, and to overcome the over-painting problem. In these systems, each pixel is generated in raster order. All objects to be drawn are retained in a display list. On each scan line, the edges of objects which intersect the scanline are held in increasing order of intersection with the scan line. These points of intersection, or edge crossings, are considered in turn, and activate or deactivate objects in the display list. Between each pair of edges considered, the color data for each pixel which lies between the first edge and the second edge is generated based on which objects are not obscured by opaque objects for that span of pixels (pixel-run). In preparation for the next scanline, the coordinate of intersection of each edge is updated in accordance with the nature of each edge, and the edges are sorted into increasing order of intersection with that scanline. Any new edges are also merged into the list of edges, which is called the active edge list. In the present description, render methods that only render objects in a pixel run that are not obscured by opaque objects are referred to as "pixel sequential render methods".

Graphics systems which use such pixel sequential rendering have significant advantages in that there is no framestore or line store and no unnecessary over-painting. Objects requiring compositing are processed on a per-pixel basis using each object's original color data.

Pixel sequential rendering suffers when there are large numbers of edges that must be tracked and maintained in sorted order by ascending x, for each scanline. As each edge is updated in a scanline, the edge is re-inserted into the active edge list, usually by an insertion sort. For complex pages, which may consist of hundreds of thousands of edges, the time required to maintain the sorted list of edges for each scanline becomes a large portion of the total time to render a complex page.

SUMMARY

It is an object of the present invention to substantially overcome, or at least ameliorate, one or more disadvantages of existing arrangements.

According to a first aspect of the invention there is provided a method of rendering an image described by a list of graphical objects, the method comprising the steps of:

assigning objects in the list to at least one of a first set of objects and a second set of objects;

rendering the first set of objects to an image store using a first rendering method that determines whether a portion of an object of the first set contributes to a rendered output of the first set of objects and, if so, the first rendering method renders the portion; and rendering the second set of objects to the image store using a second rendering method that renders each object in the second set independently of the other objects in the second set.

According to a further aspect of the invention there is provided a method of rendering an object-based image, the method comprising the steps of:

receiving a display list that lists objects of the image in priority order from a lowest-priority object to a highest-priority object, wherein the display list has a last-compositing object that is the highest priority object requiring compositing;

processing a first render task that operates on objects in the display list from the lowest-priority object up to and including the last-compositing object; and processing at least one second render task that operates on one or more objects in the display list having a priority higher than the last-compositing object, wherein the first render task determines whether a portion of an object contributes to a rendered output of the objects processed by the first render task and, if so, renders the portion, and wherein the second render task renders objects to an image store independently of the other objects processed by the second render task.

According to a further aspect of the invention there is provided a method of forming an image described by data represented as graphical objects, the method comprising the steps of:

(a) receiving a list of objects describing the image, wherein the objects are ordered in priority order from a lowest-priority object to a highest-priority object;

(b) considering objects in the list in order of increasing priority and, for each currently-considered object:

(ba) rendering the currently-considered object to an image store using a first rendering method if the currently-considered object does not require compositing; and (bb) if the currently-considered object requires compositing, performing the steps of:

(bb)(i) determining objects in the list having lower priority than the currently-considered object and having a bounding box that overlaps a bounding box of the currently-considered object; and (bb)(ii) rendering the currently-considered object and the determined objects using a second rendering method that determines whether a portion of an object contributes to a rendered output of a set of objects processed by the second rendering method and, if so, the second rendering method renders the portion.

According to a further aspect of the invention there is provided a method of rendering an object-based image, the method comprising the steps of:

(a) receiving a display list that lists objects in the image in priority order from a lowest-priority object to a highest-priority object;

(b) assigning objects in the display list to at least one of a first set of objects and a second set of objects according to at least one predetermined criterion;

(c) rendering objects in the first set of objects using a first rendering method; and (d) rendering objects in the second set of objects using a second rendering method, wherein, for each run of sequential pixels to be rendered, the first rendering method comprises the steps of:

(ca) determining objects in the first set of objects that are active for the run of pixels;

(cb) identifying an opaque object that has the highest priority of the determined active objects; and (cc) rendering the highest opaque object and non-opaque active objects that have higher priority than the highest opaque object;

and wherein, for each run of sequential pixels to be rendered, the second rendering method comprises the steps of:

(da) checking whether a current object in the second set of objects is active, the second set being considered in order of increasing priority; and (db) rendering the current object to an image store if the current object is active.

According to a further aspect of the invention there is provided a method of rendering an object-based image, the method comprising the steps of:

receiving a list of objects in the image in priority order from a lowest-priority object to a highest-priority object;

assigning objects in the list to at least one set of objects, wherein objects in the set have consecutive priority orders in the list and wherein each object in the set does not overlap any other object in the set; and rendering the at least one set of objects to an image store.

According to a further aspect of the invention there is provided a method of rendering an image described by a list of graphical objects, the method comprising the steps of:

assigning objects in the list to at least one of a first set of objects and a second set of objects;

rendering objects in the first set using a pixel sequential render method; and rendering objects in the second set using a Painter's algorithm render method.

According to a further aspect of the invention there is provided an apparatus for rendering an image described by a list of graphical objects, the apparatus comprising:

first means for rendering objects to an image store using a first rendering method that determines whether a portion of an object contributes to a rendered output of a set of objects processed by said first means and, if so, said first means renders the portion;

second means for rendering objects to the image store using a second rendering method that renders each object received by said second means independently of the other objects received by said second means; and means for assigning graphical objects in the list to at least one of said first means and said second means.

According to a further aspect of the invention there is provided an apparatus for rendering an object-based image, the apparatus comprising:

first means for rendering objects to an image store using a first rendering method that determines whether a portion of an object contributes to a rendered output of a set of objects processed by said first means and, if so, said first means renders the portion;

second means for rendering objects using a second rendering method that renders each object received by said second means to the image store independently of the other objects received by said second means;

means for receiving a list of objects in the image, wherein objects in the list are ordered in priority order from a lowest-priority object to a highest-priority object and the list has a last-compositing object that is the highest priority object requiring compositing;

means for assigning objects to said first means for rendering and said second means for rendering, wherein said means for assigning assigns a first portion of the list from the lowest-priority object up to and including the last-compositing object to said first means for rendering, and assigns one or more objects having higher priority than the highest-compositing object to said second means for rendering.

According to a further aspect of the invention there is provided an apparatus for rendering an object-based image, the apparatus comprising:

first means for rendering objects to an image store using a first rendering method that determines whether a portion of an object contributes to a rendered output of a set of objects processed by said first means and, if so, said first means renders the portion;

second means for rendering objects using a second rendering method that renders each object received by said second means to the image store independently of the other received objects;

means for receiving a list of objects in the image, wherein the objects are ordered in priority order from a lowest-priority object to a highest-priority object;

means for determining, for an object that requires compositing, objects in the list that have a lower priority than the compositing object and that have a bounding box that overlaps a bounding box of the compositing object;

means for assigning non-compositing objects from the list to the second means for rendering; and means for assigning compositing objects from the list to the first means for rendering, together with the objects determined for each compositing object by said means for determining.

According to a further aspect of the invention there is provided an apparatus for rendering an object-based image, the apparatus comprising:

means for receiving a list of objects in the image in priority order from a lowest-priority object to a highest-priority object;

means for assigning objects in the list to at least one set of objects, wherein objects in the set have consecutive priority orders in the list and wherein each object in the set does not overlap any other object in the set; and means for rendering the at least one set of objects to an image store.

According to a further aspect of the invention there is provided a system for rendering an object-based image, the system comprising:

one or more first renderers that render objects to an image store using a first rendering method that determines whether a portion of an object contributes to a rendered output of a set of objects processed by the first rendering method and, if so, the first rendering method renders the portion;

one or more second renderers that render objects using a second rendering method that renders each object received by the second renderer to the image store independently of the other received objects;

a display list generator that generates a list of objects for the image, wherein the objects in the list are ordered in priority order from a lowest-priority object to a highest-priority object and the list has a last-compositing object that is the highest priority object requiring compositing;

a display list store that stores the list generated by said display list generator; and a processor in communication with said display list store and said first and second renderers, wherein the processor is programmed to assign objects from the lowest-priority object up to and including the last-compositing object to the first renderer and to assign objects having higher priority than the last-compositing object to one or more second renderers.

According to a further aspect of the invention there is provided a system for rendering an object-based image, the system comprising:

one or more first renderers that render objects to an image store using a first rendering method that determines whether a portion of an object contributes to a rendered output of a set of objects processed by the first rendering method and, if so, the first rendering method renders the portion;

one or more second renderers that render objects using a second rendering method that renders each object received by the second renderer to the image store independently of the other received objects;

a display list generator that generates a list of objects in the image, wherein objects in the list are ordered in priority order from a lowest-priority object to a highest-priority object;

a display list store that stores the list generated by said display list generator; and a processor in communication with said display list store and said first and second renderers, wherein the processor is programmed to perform the steps of:

(i) considering objects in the list in order of increasing priority and, for each currently-considered object, (ii) assigning the current object to the second renderer if the current object does not require compositing; and (iii) determining, if the current object requires compositing, objects in the list having lower priority than the currently-considered object and having a bounding box that overlaps a bounding box of the currently-considered object, and assigning the currently-considered object and the determined objects to the first renderer.

According to a further aspect of the invention there is provided a computer program product comprising machine-readable program code recorded on a machine-readable recording medium, for controlling the operation of a data processing apparatus on which the program code executes to perform a method of rendering an object-based image, the method comprising the steps of:

assigning objects in the list to at least one of a first set of objects and a second set of objects;

rendering the first set of objects to an image store using a first rendering method that determines whether a portion of an object of the first set contributes to a rendered output of the first set of objects and, if so, the first rendering method renders the portion; and rendering the second set of objects to the image store using a second rendering method that renders each object in the second set independently of the other objects in the second set.

According to a further aspect of the invention there is provided a computer program product comprising machine-readable program code recorded on a machine-readable recording medium, for controlling the operation of a data processing apparatus on which the program code executes to perform a method of rendering an object-based image, the method comprising the steps of:

receiving a display list that lists objects in the image in priority order from a lowest-priority object to a highest-priority object, wherein the display list has a last-compositing object that is the highest priority object requiring compositing;

rendering a first render task using a first rendering method, the first render task comprising objects in the display list from the lowest-priority object up to and including the last-compositing object; and rendering one or more second render tasks using a second rendering method, the second render task comprising one or more objects in the display list having a priority higher than the last-compositing object, wherein the first rendering method determines whether a portion of an object contributes to a rendered output of the first render task and, if so, the first render method renders the portion, and wherein the second rendering method renders each object in the second render task to an image store independently of the other objects in the second render task.

According to a further aspect of the invention there is provided a computer program product comprising machine-readable program code recorded on a machine-readable recording medium, for controlling the operation of a data processing apparatus on which the program code executes to perform a method of rendering an object-based image, the method comprising the steps of:

(a) receiving a list of objects describing the image, wherein the objects are ordered in priority order from a lowest-priority object to a highest-priority object;

(b) considering objects in the list in order of increasing priority and, for each currently-considered object:

(ba) rendering the currently-considered object to an image store using a first rendering method if the currently-considered object does not require compositing; and (bb) if the currently-considered object requires compositing, performing the steps of:

(bb)(i) determining objects in the list having lower priority than the currently-considered object and having a bounding box that overlaps a bounding box of the currently-considered object; and (bb)(ii) rendering the currently-considered object and the determined objects using a second rendering method that determines whether a portion of an object contributes to a rendered output of a set of objects processed by the second rendering method and, if so, the second rendering method renders the portion.

According to a further aspect of the invention there is provided a computer program product comprising machine-readable program code recorded on a machine-readable recording medium, for controlling the operation of a data processing apparatus on which the program code executes to perform a method of rendering an object-based image, the method comprising the steps of:

receiving a list of objects in the image in priority order from a lowest-priority object to a highest-priority object;

assigning objects in the list to at least one set of objects, wherein objects in the set have consecutive priority orders in the list and wherein each object in the set does not overlap any other object in the set; and rendering the at least one set of objects to an image store.

According to a further aspect of the invention there is provided a computer program comprising machine-readable program code for controlling the operation of a data processing apparatus on which the program code executes to perform a method of a method of rendering an object-based image, the method comprising the steps of:

assigning objects in the list to at least one of a first set of objects and a second set of objects;

rendering the first set of objects to an image store using a first rendering method that determines whether a portion of an object in the first set contributes to a rendered output of the first set and, if so, the first rendering method renders the portion; and rendering the second set of objects to the image store using a second rendering method that renders each object in the second set independently of the other objects in the second set.

According to a further aspect of the invention there is provided a computer program comprising machine-readable program code for controlling the operation of a data processing apparatus on which the program code executes to perform a method of a method of rendering an object-based image, the method comprising the steps of:

receiving a display list that lists objects in the image in priority order from a lowest-priority object to a highest-priority object, wherein the display list has a last-compositing object that is the highest priority object requiring compositing;

rendering a first render task using a first rendering method, the first render task comprising objects in the display list from the lowest-priority object up to and including the last-compositing object; and rendering one or more second render tasks using a second rendering method, the second render task comprising one or more objects in the display list having a priority higher than the last-compositing object, wherein the first rendering method determines whether a portion of an object contributes to a rendered output of the first render task and, if so, the first rendering method renders the portion, and wherein the second rendering method renders each object in the second render task to an image store independently of the other objects in the second render task.

According to a further aspect of the invention there is provided a computer program comprising machine-readable program code for controlling the operation of a data processing apparatus on which the program code executes to perform a method of a method of rendering an object-based image, the method comprising the steps of:

(a) receiving a list of objects describing the image, wherein the objects are ordered in priority order from a lowest-priority object to a highest-priority object;

(b) considering objects in the list in order of increasing priority and, for each currently-considered object:

(ba) rendering the currently-considered object to an image store using a first rendering method if the currently-considered object does not require compositing; and (bb) if the currently-considered object requires compositing, performing the steps of:

(bb)(i) determining objects in the list having lower priority than the currently-considered object and having a bounding box that overlaps a bounding box of the currently-considered object; and (bb)(ii) rendering the currently-considered object and the determined objects using a second rendering method that determines whether a portion of an object contributes to a rendered output of a set of objects processed by the second rendering method and, if so, the second rendering method renders the portion.

According to a further aspect of the invention there is provided a computer program comprising machine-readable program code for controlling the operation of a data processing apparatus on which the program code executes to perform a method of a method of rendering an object-based image, the method comprising the steps of:

receiving a list of objects in the image in priority order from a lowest-priority object to a highest-priority object;

assigning objects in the list to at least one set of objects, wherein objects in the set have consecutive priority orders in the list and wherein each object in the set does not overlap any other object in the set; and rendering the at least one set of objects to an image store.

BRIEF DESCRIPTION OF THE DRAWINGS

One or more embodiments of the present invention will now be described with reference to the drawings, in which.

BRIEF DESCRIPTION OF THE TABLES

The embodiments of the present invention are also described with reference to the tables listed at the end of the detailed description and before the claims.

Figure 1A:
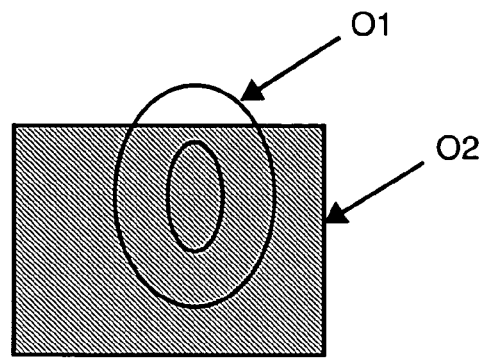
FIG. 1A is an example of an image showing a semi-transparent square over an opaque character 'O'.
Figure 1B:
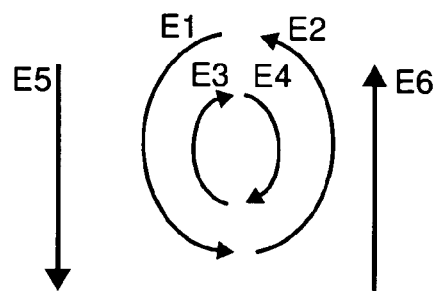
FIG. 1B shows the edges for the objects of FIG. 1A.
Figure 1C:
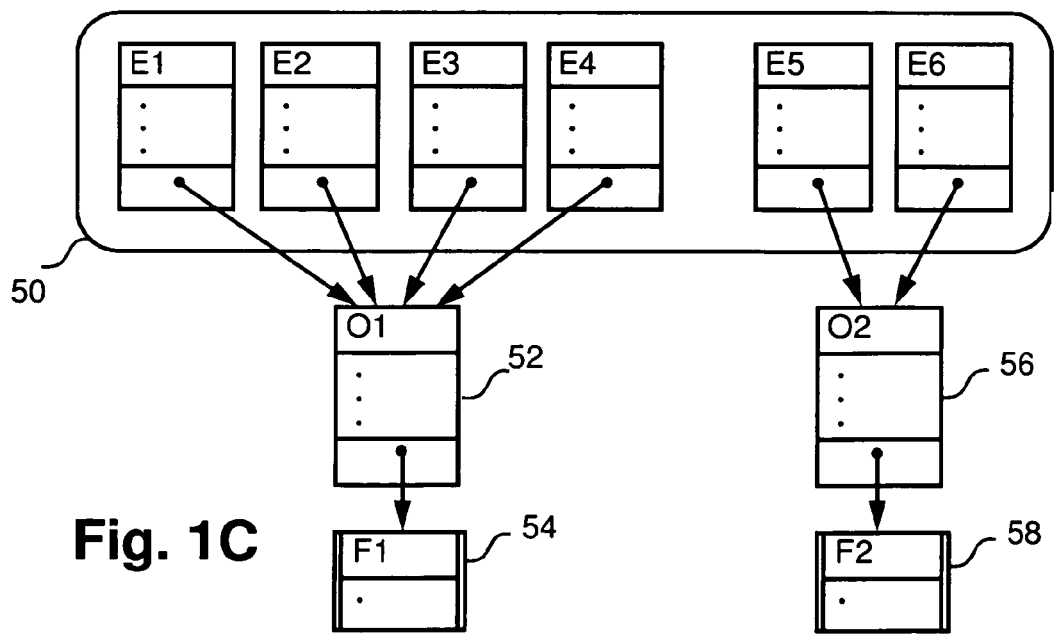
FIG. 1C shows a schematic block diagram of an edge list of the example of FIG. 1A.
Figure 2:
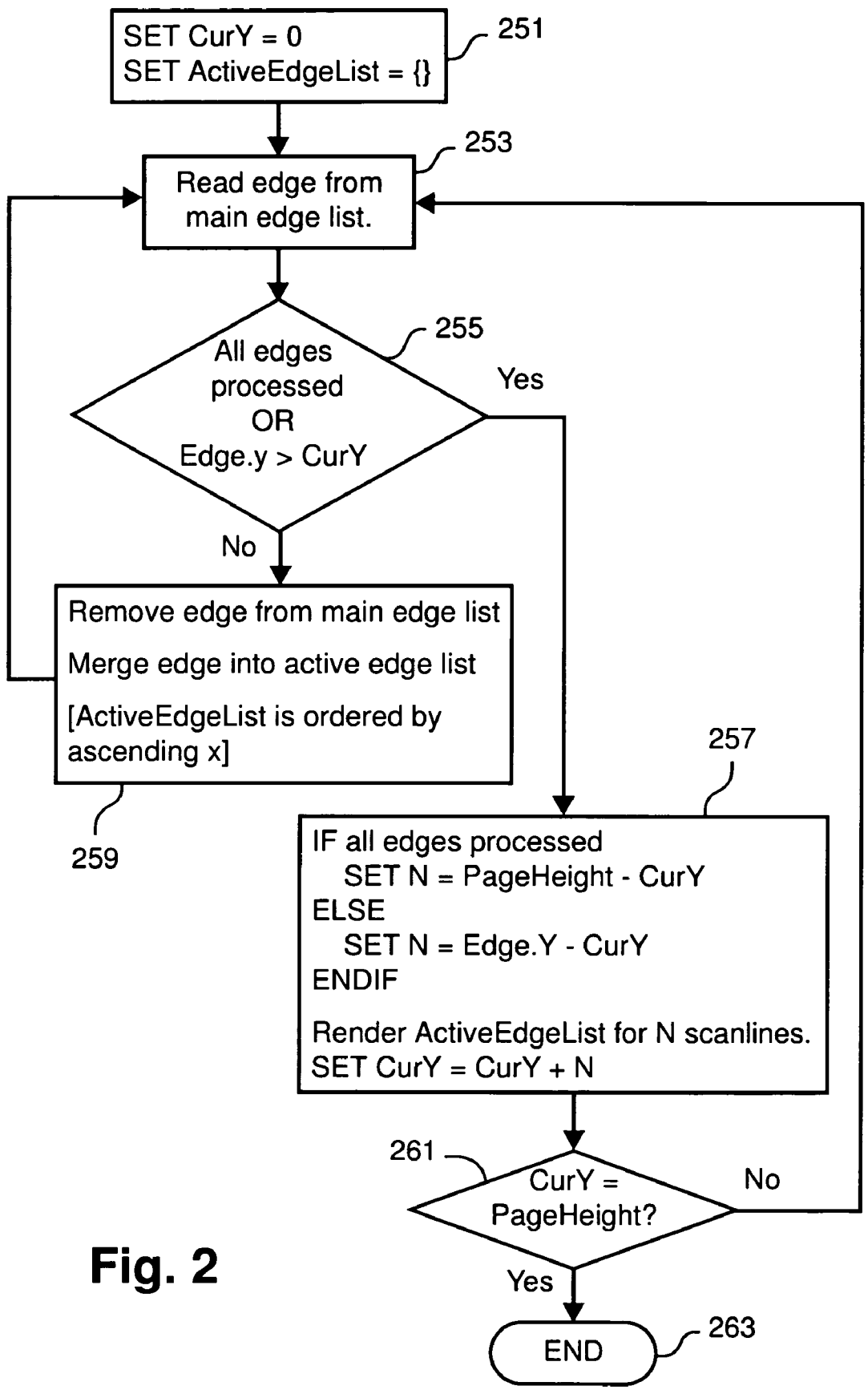
FIG. 2 is a flowchart of a method for determining the active edges of a main edge list, and determining the number of scanlines for which this set of active edges should be rendered.

Table A illustrates how the method FIG. 2 is applied to the example of FIG. 1.

Figure 3A:
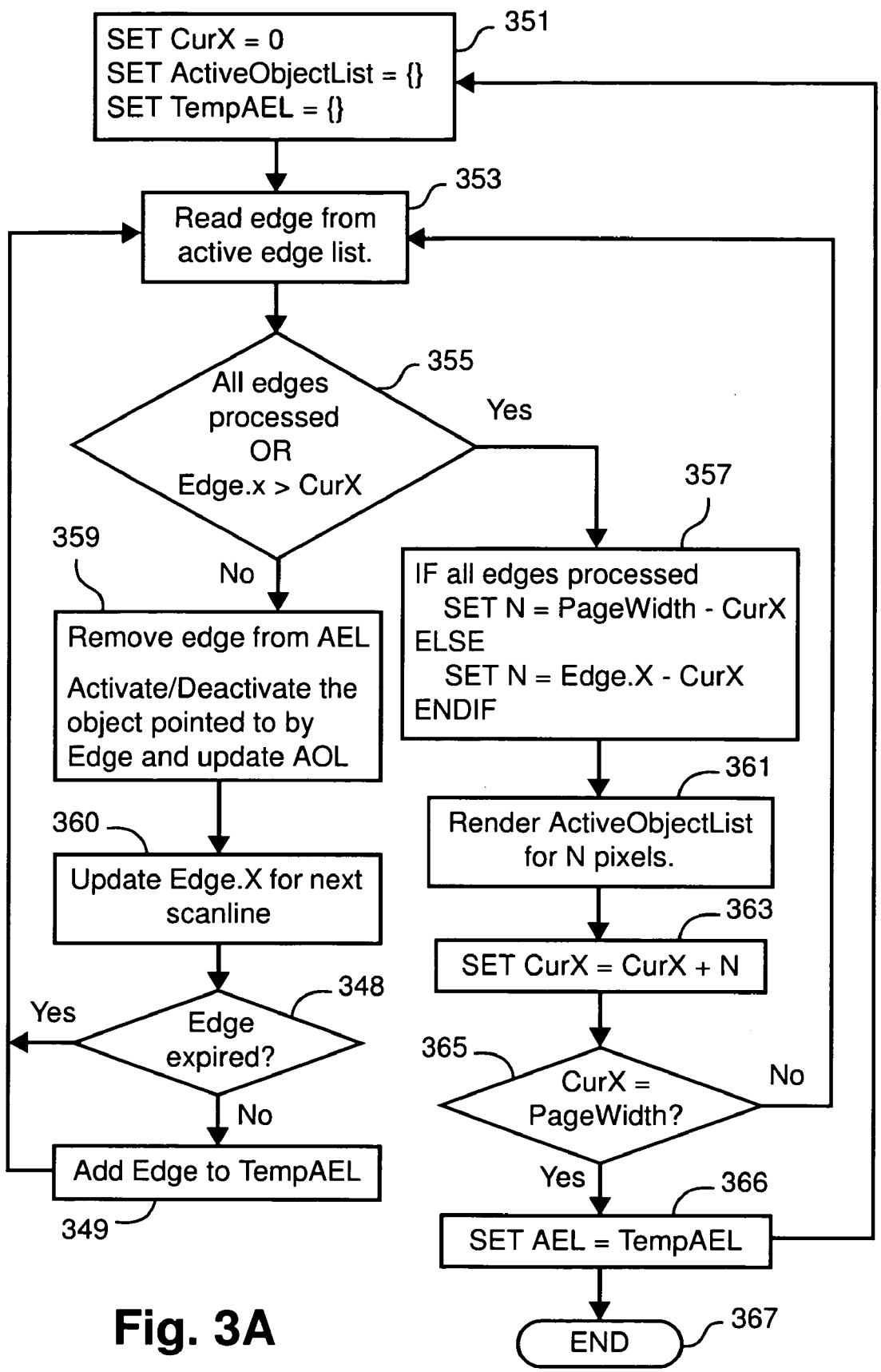
FIG. 3A is a flowchart of a method for rendering a scanline from the active edges calculated by the method steps of FIG. 2.

Table B illustrates how the method of FIG. 3A is applied to a scanline of the example of FIG. 1A.

Figure 6A:
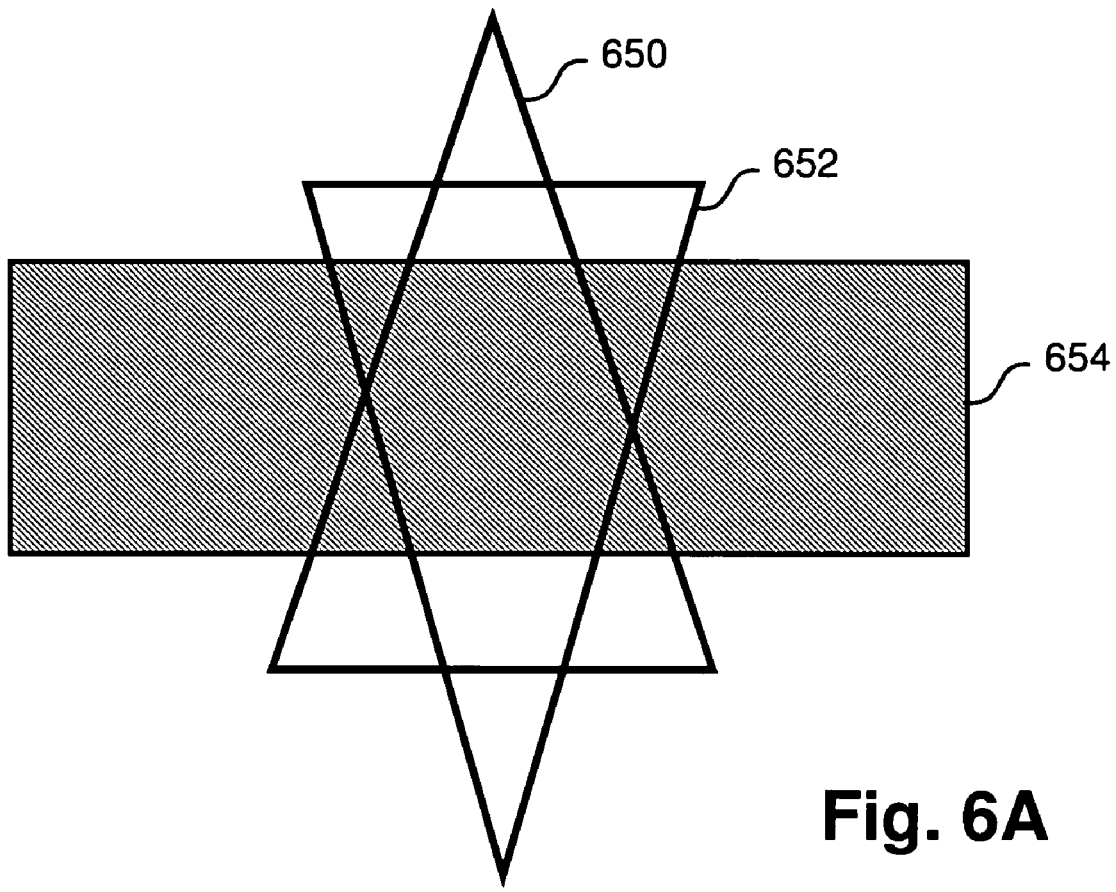
FIG. 6A shows an example of an image in which two triangular clips clip a rectangle.
Figure 6B:
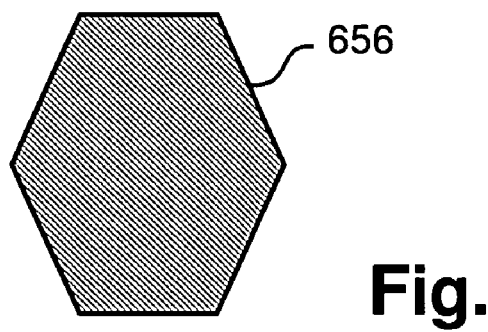
FIG. 6B shows the result of rendering the rectangle and clips of FIG. 6A.
Figure 6C:
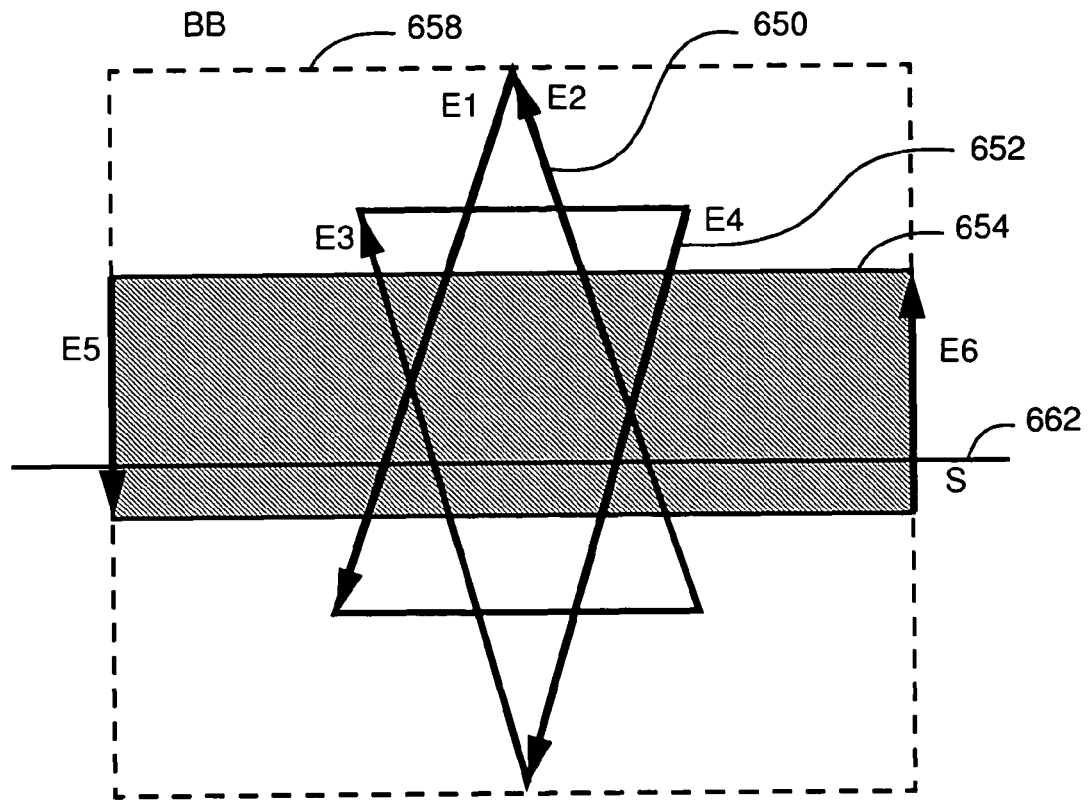
FIG. 6C shows the edges of the objects in FIG. 6A.
Figure 7:
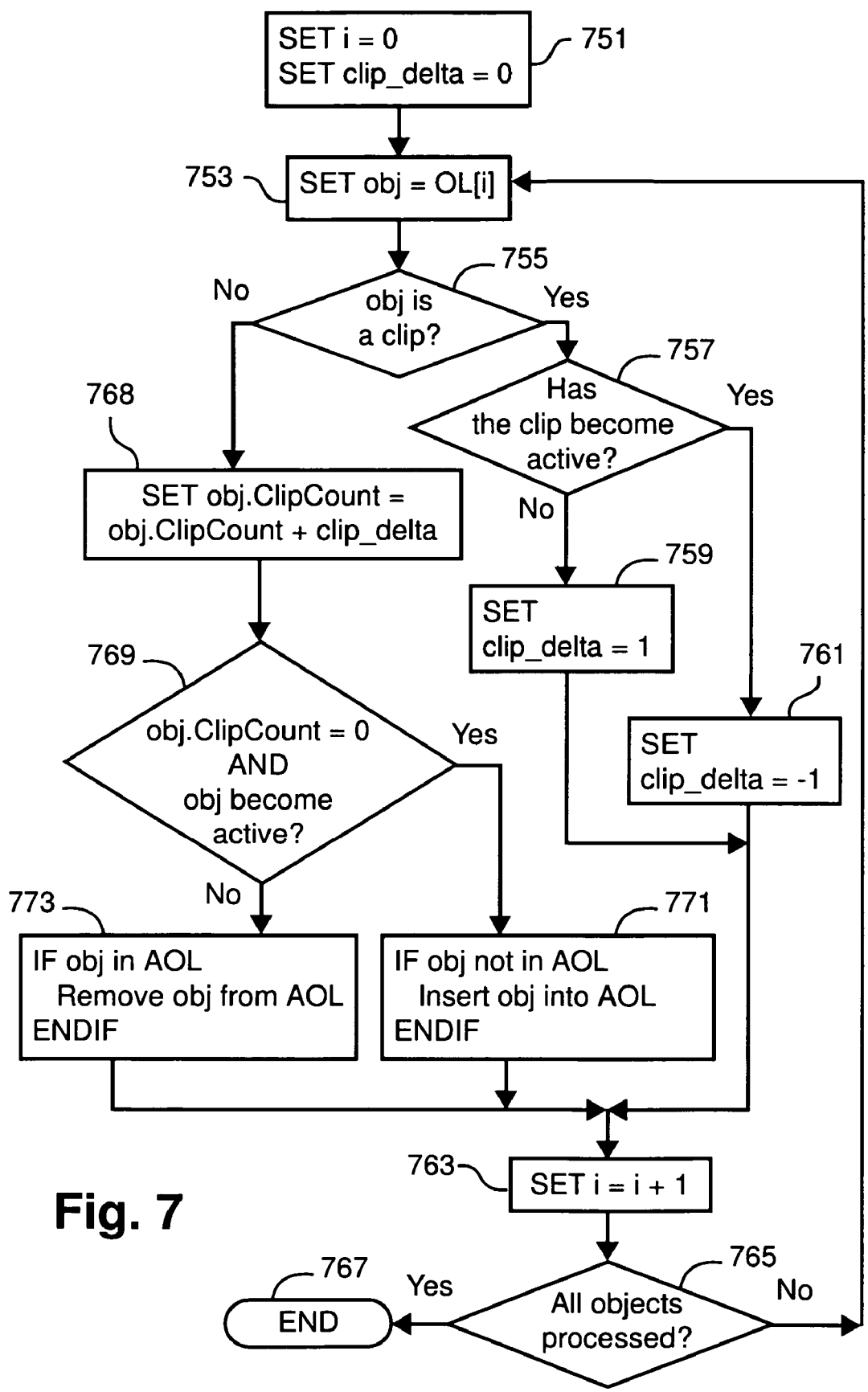
FIG. 7 is a flowchart of a method for determining whether to activate or deactivate an object in a pixel sequential render method, taking clipping into account.

Table C illustrates how the method of FIG. 7 is applied to the first three edges of scanline 662 of FIG. 6C.

Table D illustrates the application of the third arrangement to scanline 1130 of FIG. 11.

DETAILED DESCRIPTION INCLUDING BEST MODE

Some portions of the description which follows are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that the above and similar terms are to be associated with the appropriate physical quantities and are merely convenient labels applied to these quantities. Unless specifically stated otherwise, and as apparent from the following, it will be appreciated that throughout the present specification, discussions utilizing terms such as "calculating", "determining", "replacing", "generating" "initializing", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers or other such information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate.

In addition, the present invention also implicitly discloses a computer program, in that it would be apparent to the person skilled in the art that the individual steps of the preferred method described herein are to be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing the spirit or scope of the invention.

Furthermore, one or more of the steps of the computer program may be performed in parallel rather than sequentially.

Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the preferred method.

Where reference is made in any one or more of the accompanying drawings to steps and/or features, which have the same reference numerals, those steps and/or features have for the purposes of this description the same function(s) or operation(s), unless the contrary intention appears.

The following acronyms are used in the present disclosure:

PSRM: Pixel-Sequential Rendering Method

PARM: Painter's Algorithm Rendering Method

IPARM: Improved Painter's Algorithm Rendering Method

XPSRM: Exclusive Pixel-Sequential Rendering Method

DL: Display List

OL: Object List

CL: Compositing List

AEL: Active Edge List

AOL: Active Object List

RT: Render Task

PART: Painter's Algorithm Render Task

PSRT: Pixel-Sequential Render Task

GDI: Graphics Device Interface

RIP: Raster Image Processor 1.0 Rendering Apparatus

Figure 18:
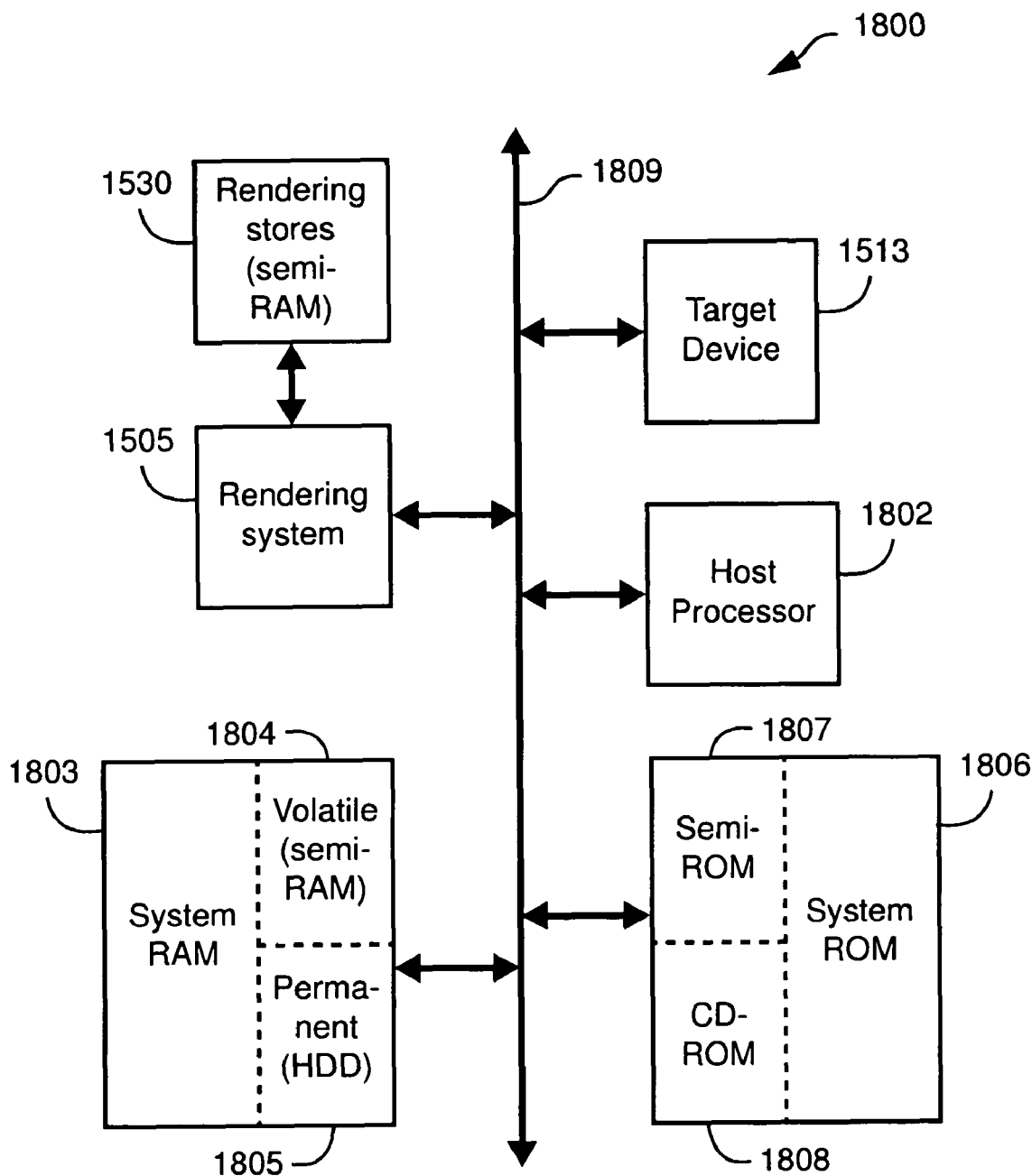
FIG. 18 is a schematic block diagram representation of a computer system incorporating a rendering arrangement.

FIG. 18 illustrates schematically a system 1800 configured for rendering and presenting computer graphic object images. The system includes a host processor 1802 associated with system random access memory (RAM) 1803, which may include a non-volatile hard disk drive or similar device 1805 and volatile, semiconductor RAM 1804. The system 1800 also includes a system read-only memory (ROM) 1806 typically founded upon semiconductor ROM 1807 and which in many cases may be supplemented by compact disk devices (CD ROM) 1808. The system 1800 may also incorporate a target device 1513 for displaying images, such as a printer or video display unit (VDU) which operates in raster fashion.

The above-described components of the system 1800 are interconnected via a bus system 1809 and are operable in a normal operating mode of computer systems well known in the art, such as IBM PC/AT type personal computers and arrangements evolved therefrom.

Also seen in FIG. 18, a graphic rendering system 1505 (or renderer) connects to the bus 1809, and is configured for the rendering of pixel-based images derived from graphic object-based descriptions supplied with instructions and data from the processor 1802 via the bus 1809. The renderer 1505 may utilize the system RAM 1803 for the rendering of object descriptions although preferably the renderer 1505 may have associated therewith a dedicated rendering store arrangement 1530, typically formed of semiconductor RAM.

The rendering system 1505 may be implemented as software on the host processor 1802. Alternatively, the rendering system 1505 may be implemented on a separate unit, which may be a custom-built hardware unit or which may be software running on a general-purpose computer. In a further alternative, the rendering system may be an embedded system on the target device 1513.

Figure 15:
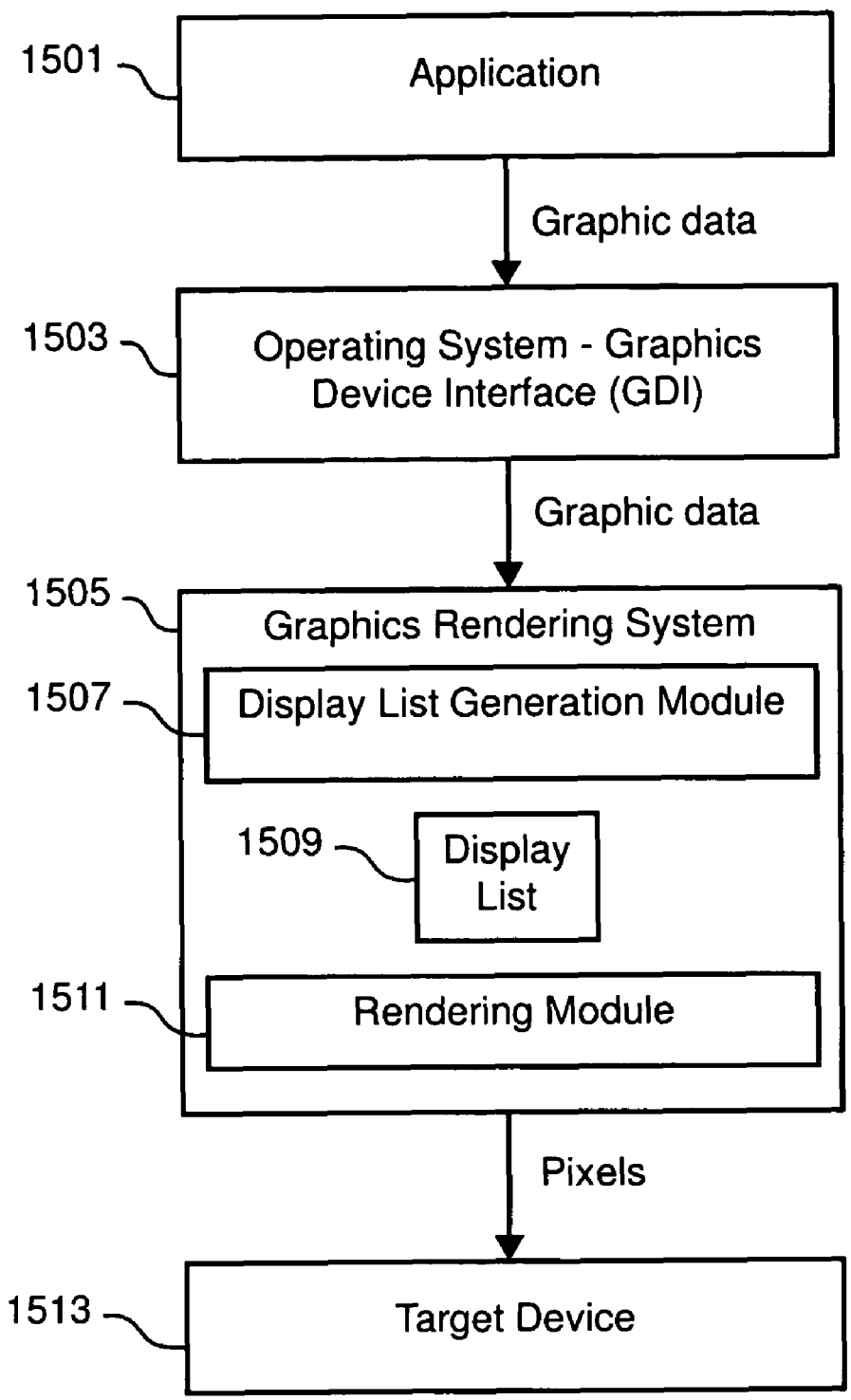
FIG. 15 is a schematic block diagram of a render pipeline in which the rendering arrangements of the present disclosure may be implemented.

The rendering pipeline is illustrated in FIG. 15. An application 1501 running on the host processor 1802 sends graphics data to the Graphics Device Interface (GDI) 1503 of the host processor's operating system. The GDI 1503 processes the graphics data and passes the data to the graphics rendering system 1505, which has a display list generation module 1507 and a rendering module 1511.

The display list generation module 1507 generates a display list from a set of objects defined in the data received from the GDI 1503. Objects in the display list are ordered in z-level (priority) order from a lowest-priority object to a highest priority object. The display list is stored in the display list store 1509. The rendering module 1511 processes the display list, generating pixels for printing.

In the case that the renderer 1505 is resident as software on the host computer 1802, the renderer 1505 generates a half-toned bitmap. The bitmap is compressed and sent to the target device 1513, which decompresses the bitmap and renders the page of pixel data.

In an alternative configuration the display list generation module 1507 resides on the host computer 1802 and the rendering module 1511 is embedded in the target device 1513. In this case the host processor 1802 sends the display list to the target device 1513, which renders the display list and generates pixel data for printing.

The rendering module 1511 uses a plurality of rendering methods, which are described in more detail below. The module 1511 assigns different portions of the display list to different render tasks according to criteria discussed below, wherein different render tasks use different render methods. The rendering module 1511 may use a render task queue to queue render task threads that execute concurrently. The render methods used include a pixel-sequential rendering method (PSRM) discussed in section 3.0, a Painter's Algorithm render method (PARM) described in section 4.0, an improved PARM (or IPARM) described in section 6.0 and an exclusive PSRM (XPSRM) described in section 8.0. Three arrangements are described that use different combinations of the described render methods.

2.0 Data Structures

As the display list generation module 1507 receives an object from the GDI layer 1503, it decomposes the object into three components:

Edges, describing the outline of the object;

Drawing information, describing how the object is drawn on the page; and

Fill information, describing the color of the object.

Outlines of objects are broken into up edges and down edges, where each edge proceeds monotonically down the page. An edge is assigned the direction up or down depending on whether the edge activates or deactivates the object when scanned along a scanline.

Edges are implemented in software as a data structure. The data structure contains:

points describing the outline of the edge;

the x position of the edge on the current scanline; and edge direction.

Drawing information, or level data, is stored in a level data structure. The data structure typically contains:

z-order integer, called the priority;

a fill-rule, such as odd-even or non-zero-winding;

information about the object (such as whether the object is a text object, graphic object or image object);

a compositing operator;

the type of fill being drawn, such as a bitmap, tile, or flat color; and a clip-count, indicating how many clips are clipping this object.

Fill information, or fill data, is stored in a data structure called a fill data structure. The contents of the data structure depend on the fill type. For a bitmap fill, the data structure typically contains:

x and y location of the bitmap origin on the page;

width and height of the bitmap in pixels;

a page-to-image transformation matrix;

a value indicating the format of the image data, (for example 32 bpp RGBA, or 24 bpp BGR, etc. . . . ); and a pointer to the image data.

For a flat fill, the data structure typically contains a single 32 bit integer—eight bits for each of the red, green, blue and alpha channels.

Each edge data structure generally has a pointer to a level data structure. Each level data structure also has a pointer to a fill data structure.

FIG. 1A shows an image having a first object O1 that is an opaque orange character 'O' and a second object O2 over the first object, object O2 being a semi-transparent red square.

FIG. 1B shows the edges of objects O1 and O2. Object O1 has— edges=E1 (down), E2 (up), E3 (up), E4 (down);

level data={fill-rule=non-zero-winding, object-type=text, priority=1}; and fill data=RGBA=255, 128, 0, 255 (opaque orange).

Object O2 has— edges=E5 (down), E6 (up);

level data={fill-rule=non-zero-winding, object-type=graphic, priority=2}; and fill data=RGBA=255, 0, 0, 128 (semi-transparent red).

FIG. 1C shows the edge list 50 for the image of FIG. 1A. Edges E1 to E4 point to the level data 52 containing drawing information for the object O1, and edges E5 and E6 point to the level data 56 of object O2. Level data 52 and 56 point to the fill data 54 and 58 respectively containing fill information for the objects O1, O2.

With the data structured in the described manner, the display list can be rendered from the list of edges. This is referred to as an edge-based display list.

In the example of FIG. 1A, the display list is the edge list {E1, E2, E3, E4, E5, E6}.

The display list is firstly sorted by ascending y coordinate and then by ascending x coordinate when y coordinates are equal. The sorted edge list for FIG. 1A is the edge list {E1, E2, E5, E6, E3, E4}.

3.0 Pixel-Sequential Rendering Method (PSRM)

The pixel sequential rendering method used by the rendering module 1511 generates the color and opacity for the pixels one at a time in raster scan order. At any pixel currently being scanned and processed, the pixel sequential rendering method composites only those exposed objects that are active at the currently scanned pixel. The pixel sequential rendering method determines that an object is active at a currently scanned pixel if that pixel lies within the boundary of the object. The renderer 1505 achieves this by reference to a fill counter associated with that object. The fill counter keeps a running fill count that indicates whether the pixel lies within the boundary of the object. When the renderer 1505 encounters an edge associated with the object it increments or decrements the fill count depending upon the direction of the edge. The renderer 1505 is then able to determine whether the current pixel is within the boundary of the object depending upon the fill count and a predetermined fill rule. The renderer 1505 when using the PSRM determines whether an active object is exposed with reference to a flag associated with that object. This flag associated with an object indicates whether or not the object obscures lower priority objects. That is, the flag indicates whether the object is partially transparent, in which case the lower priority active objects will make a contribution to the color and opacity of the current pixel. Otherwise, the flag indicates that the object is opaque, in which case active lower priority objects will not make any contribution to the color and opacity of the currently scanned pixel. The pixel sequential rendering method determines that an object is exposed if it is the uppermost active object, or if all the active objects above the object have their corresponding flags set to transparent. The renderer 1505 then composites these exposed active objects to determine and output the color and opacity for the currently scanned pixel.

3.1 PSRM: Determining Active Edges

FIG. 2 is a flow chart illustrating how the active edges are determined from the main edge list in a Pixel-Sequential Rendering Method. The main edge list contains all the edges to be rendered, and the active edge list is a temporary list of edges that intersect a current scanline.

Step 251 is an initializing step in which the variable CurY is set to zero and the active edge list is set to the empty set. Then, in step 253, the renderer 1511 reads an edge from the main edge list. In step 255 the renderer 1511 checks whether all edges in the main edge list have been processed, or whether the y-value of the currently-read edge, Edge.y, is greater than the value stored in the variable CurY.

If neither of these conditions is satisfied (the NO option of step 255) then the process proceeds to step 259, in which the current edge is merged into the active edge list. Edges in the current edge list are ordered by ascending x-value, ie the order along the scanline. Once the current edge is added to the active edge list, the process returns to step 253 to consider the next edge from the main edge list.

If either of the conditions in step 255 is satisfied (the YES option of step 255), then in step 257 the renderer 1511 determines a number of scanlines to render, N. If all edges in the main edge list have been processed, N is set to the number of scanlines remaining on the page, i.e. the difference between the page height and the current scanline:

$N=\text{PageHeight}-CurY.$

If, however, there are still edges to process, then N is set to the number of scanlines between CurY and the scanline on which the currently-read edge commences:

$N=Edge.Y-CurY.$

Once the number of scanlines has been determined, the renderer 1511 renders the active edge list for N scanlines and then updates the current scanline:

$CurY=CurY+N.$

For the pixel-sequential rendering method, the rendering of the N scanlines is further described with reference to FIG. 3A.

Next, in step 261, the renderer 1511 checks whether the updated CurY is equal to the page height. If so, the process of determining active edges terminates 263. If, however, CurY is less than the page height (the NO option of step 261) then process flow returns to step 253 to process the next edge from the main edge list.

Table A illustrates how the method of FIG. 2 may be applied to the example of FIGS. 1A to 1C. The table is to be read row by row and from left to right. Each row represents an iteration of the loop commencing at step 253. For ease of representation, step 251 is omitted. An empty box indicates that a step is not performed. Step 255 determines which one of steps 257 and 259 is performed in the current iteration of the loop.

In the first iteration of the loop, step 253 reads edge E1 from the main edge list. Since CurY is initialized to zero, the scanline on which E1 starts, E1.Y, is greater than CurY and thus step 257 is performed. The scanlines between the start of the page and E1.Y are rendered and CurY is updated.

In the final iteration of the loop, all edges have been processed and so N is set to the difference between the page height and CurY. The remaining scanlines are rendered and CurY is updated. Step 251 determines that CurY equals the page height, and the loop terminates.

3.2 PSRM: Rendering Scanlines

The flowchart of FIG. 3A illustrates how scanlines are rendered in the pixel-sequential rendering method. The process of FIG. 3A is invoked by step 257 of FIG. 2.

In the initializing step 351, the rendering apparatus 1511 sets an index CurX to zero and sets the active object list and a Temporary Active Edge List (TempAEL) to the empty set. Then, in step 353, the process enters a loop that continues until the end of the scanline, ie when CurX equals the page width. In step 353, the renderer 1511 reads an edge "Edge" from the active edge list (AEL). Then, in step 355, the renderer 1511 checks whether all edges in the active edge list have been processed, or whether Edge.X, the intersection of the current scanline and the currently-read edge, is greater than the index CurX. If either of these conditions is met, process flow proceeds to step 357. If the conditions are not met (the NO option of step 355), process flow proceeds instead to step 359.

In step 359, the currently-read edge is removed from the AEL and the object pointed to by the currently-read edge is activated or deactivated as appropriate. The activation/deactivation of objects is based on the fill rule associated with the object. Objects are either added to or removed from an active object list (AOL). The activation/deactivation and AOL updating step for clipped objects is described in more detail with reference to FIG. 7.

In the following step 360, Edge.X is updated to indicate the intersection of the currently-read edge with the next scanline. Next, in step 348, the currently-read edge is tested to see if it expires on the current scanline. If not, execution proceeds to step 349 where the edge is added to the temporary AEL, TempAEL, in the correct position to maintain the ascending x-order of that list. Otherwise (the Yes option of step 348), and also following step 349, process flow returns to step 353 to read the next edge from the active edge list.

In step 357 a number of pixels to render, N, is determined. If all edges in the active edge list have already been processed, N is set to the difference between the page width and the index CurX. Otherwise N is set to (Edge.X–CurX), i.e. the difference between the current index and the position of the currently-considered active edge.

Then, in step 361, the active object list is rendered for N pixels, as described in more detail with reference to FIG. 4.

In step 363 the index CurX is updated to (CurX+N) and step 365 checks whether CurX equals the page width. If so, in step 366 the contents of the temporary edge list are copied to the active edge list. The process then either loops back to step 351 to render the next scanline, or returns 367 to step 257 of FIG. 2. If CurX has not reached the page width (the NO option of step 365), then process flow returns to step 353.

Table B illustrates the method of FIG. 3A applied to a scanline of the image of FIG. 1A having the active edge list={E5, E1, E3, E4, E2, E6}, i.e., any of the scanlines that pass through the central hole of the 'O' character O1.

As before, each row of the table illustrates an iteration of the loop commencing at step 353. The checking step 355 determines whether path 359/360 or path 357/361/363 is followed. An empty box indicates that the steps are not performed in a current iteration of the loop. The termination steps 365 and 367 are not shown explicitly.

Initially, CurX is zero and the active object list (AOL) is empty.

3.3 PSRM: Rendering Pixels on a Scanline

Figure 4:
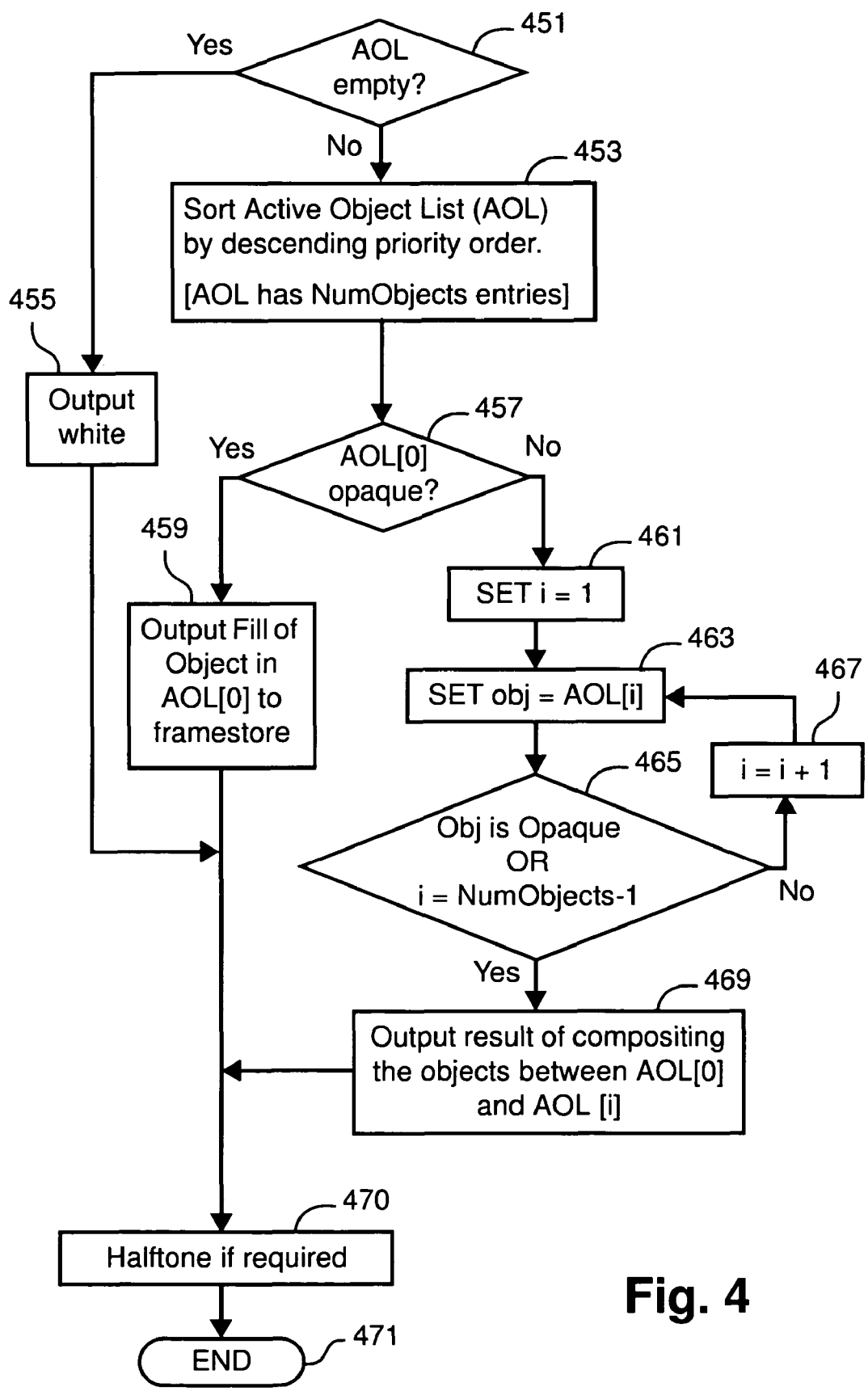
FIG. 4 is a flowchart of a method for determining which objects contribute to a pixel run in a pixel sequential rendering method.

The flowchart of FIG. 4 illustrates a method of rendering pixels on a scanline in which only the highest opaque object and any transparent objects lying above the highest opaque object are composited and output. The steps of FIG. 4 are invoked by step 361 of FIG. 3A.

In step 451 the renderer 1511 checks whether the active object list (AOL) is empty. If so, the renderer 1511 outputs white (the page background) for N pixels, halftoning in step 470 (if required) to the bit depth of the framestore. The process terminates in step 471 and returns to step 363.

If the active object list is not empty (the NO option of step 451) then process flow proceeds to step 453, in which the active object list is sorted by descending priority order. The number of entries in the active object list is NumObjects.

Then, in step 457, the renderer 1511 checks whether the first object in the active object list is opaque. If so, step 459 outputs the fill of the object in AOL[0] to the framestore, halftoning in step 470 (if required) to the bit depth of the framestore, and the process terminates in step 471. In this case there is no need to consider any other objects in the active object list, since the topmost object is opaque.

If the topmost object is not opaque (the NO option of step 457) then the renderer in step 461 sets index i=1. In step 463 Obj is set to the object in the ith entry of the active object list. Step 465 checks whether Obj is opaque or whether the index i equals the total number of objects, (NumObjects−1), in the active object list.

If either condition is met (the YES option of step 465) then the renderer 1511 in step 469 outputs the result of compositing all objects between AOL[0] and AOL[i] to the framestore, halftoning in step 470 (if required) to the bit depth of the framestore. The process then terminates in step 471.

If neither of the conditions in step 465 is met (the NO option of step 467), then process flow proceeds to step 467, which increments the index, i=i+1. The process then returns to step 463 to consider the next object in the active object list.

As an example of the application of the process of FIG. 4, consider the run of pixels in the left half of object O1 in FIG. 1A at scanline E3.Y (i.e. the scanline on which edge E3 begins) between pixels E1.X and E3.X. For this run of pixels both objects are active and the active object list is AOL={O1, O2}.

At step 451, the AOL is checked to see if it is empty. The AOL contains two entries, so execution proceeds to step 453. The AOL is sorted by descending priority order, resulting in AOL={O2, O1}. The value of NumObjects is 2. Step 457 checks whether the first entry in the list is opaque. O2 is not opaque, so execution proceeds to step 461. The counter i is initialized to one at step 461, and then at step 463 the variable obj is set to the object at location AOL[i], which in this case is O1. At step 465, since O1 is opaque, execution proceeds to step 469. The fills of objects O2 and O1 are composited together and the result is written to the frame store.

3.4 Clipping within a PSRM

In some systems, such as Microsoft™ GDI, objects are accompanied by a clipping region, and an object is only output inside the area defined by the corresponding clipping region.

In such systems, each object is typically rendered in turn to the framestore, clipped by the corresponding clipping region. Some systems allow multiple clipping regions to be active. Thus, an object can be rendered to the framestore clipped by more than one clipping region.

In the pixel-sequential rendering method (PSRM), a clip is typically represented by a set of edges and an "object list" of level data structures, where the first entry in the list is the level data structure describing the clip itself. The remaining entries in the level data structure describe the objects being clipped.

An example of a clipped image is shown in FIG. 6A The three objects in FIG. 6A are a triangular clip 650, an upside-down triangular clip 652, and a rectangle 654 that is clipped by clips 650 and 652. FIG. 6B shows the six-sided shape 656 that results from rendering the objects of FIG. 6A.

FIG. 6C shows the edges of the objects 650-654. Clip 650 has a left edge E1 and a right edge E2. Clip 652 has a left edge E3 and a right edge E4, and rectangle 654 is defined by a left edge E5 and a right edge E6. Bounding box 658 delimits the outer points of objects 650, 652, 654. Scanline S 662 is used to illustrate the application of the method of FIG. 7 to the example of FIG. 6A.

Figure 6D:
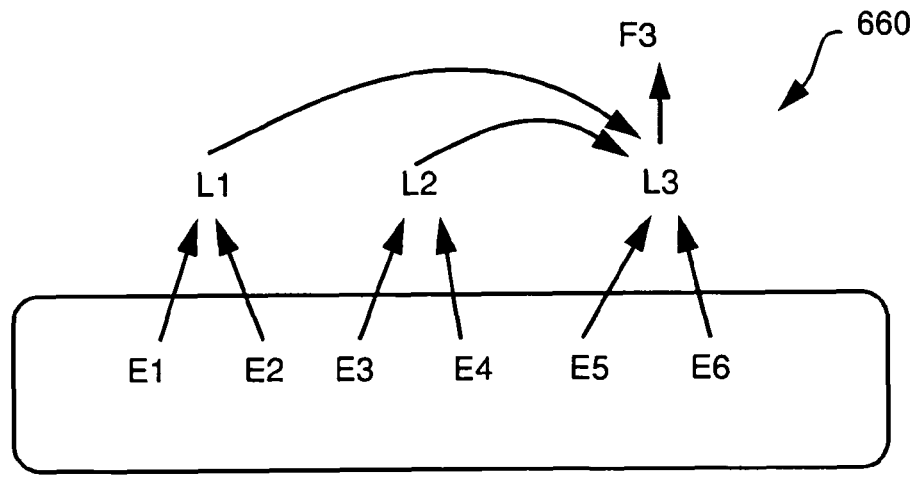
FIG. 6D shows a schematic representation of a display list in memory of the objects in FIG. 6A.

FIG. 6D shows the preferred arrangement in memory of the display list 660 of the image of FIG. 6A. In FIG. 6D, each edge points to the level data containing drawing information for the corresponding object. For edges E1 and E2, this is level data L1, for edges E3 and E4, this is level data L2, and for edges E5 and E6 this is level data L3. Objects 650 and 652 are clipping objects having level data L1, L2 that points to the level data L3 for object 654. The level data L3 for object 654 in turn points to the fill data F3 containing fill information for object 654.

The level data structure includes a clip count associated with objects to indicate how many clipping regions clip the associated object. In this example, the object 654 has L3.ClipCount=2, indicating that object 654 is clipped by two clips.

FIG. 7 illustrates the management of the active object list (AOL). The steps of FIG. 7 are invoked by step 359. The input of FIG. 7 is the active-object list and a list of level data structures pointed to by a current edge. The output of FIG. 7 is an active-object list that may have been modified by adding an activated object or removing a de-activated object.

In the initialization step 751, counter i is initialized to zero and variable clip_delta is initialized to zero. Then, in step 753, the renderer 1511 sets variable obj to OL[i], which is the i$^{th}$ object in the object list OL associated with the current edge. In step 755 the renderer 1511 checks whether obj is a clip. If so, then in step 757 the renderer 1511 checks whether the clip has become active. If the clip has become active, the variable clip_delta is set to (−1) in step 761. If the clip has not become active clip_delta is set to 1 in step 759.

After clip_delta has been set in either step 759 or 761, process flow proceeds to step 763, in which the counter i is incremented by 1. Step 765 then checks whether all objects associated with the current edge have been processed. If so, the process of FIG. 7 terminates and control flow returns to step 360. If there are further objects associated with the current edge (the NO option of step 765) then process flow returns to step 753 to process the next object.

If the object currently being considered is not a clip (the NO object of step 755) then in step 768 the renderer 1511 increments the clip count of the current object by the value of clip_delta:

Obj.ClipCount=obj.ClipCount+clip_delta.

Next, in step 769, the renderer 1511 checks whether the object obj has become active and whether the clip count of obj is zero. If both these conditions are met, then in step 771 the renderer 1511 adds obj to the active-object list (if obj is not already in the active-object list).

If the both conditions in step 769 are not met (the NO option of step 769), then, if object obj is in the active-object list, the renderer 1511 removes obj from the active-object list.

After step 771 or step 773, process flow passes to step 763 which, as described above, determines whether there are any more objects associated with the current edge.

As an example, Table C shows how the steps of FIG. 7 operate on the first three edges of scanline 662 shown in FIG. 6C.

4.0 Painter's Algorithm Rendering Method (PARM)

A rendering method using the Painter's algorithm has some similarities with the pixel-sequential rendering method described above. Both the PARM and the PSRM require edges to be tracked and maintained in ascending x-order for each scanline. A PARM may be implemented using the procedures of FIGS. 2, 3B and 7.

FIG. 2, as described above, is a method of determining the active-edge list. The steps of FIG. 2 apply to both the PSRM and the PARM.

Figure 3B:
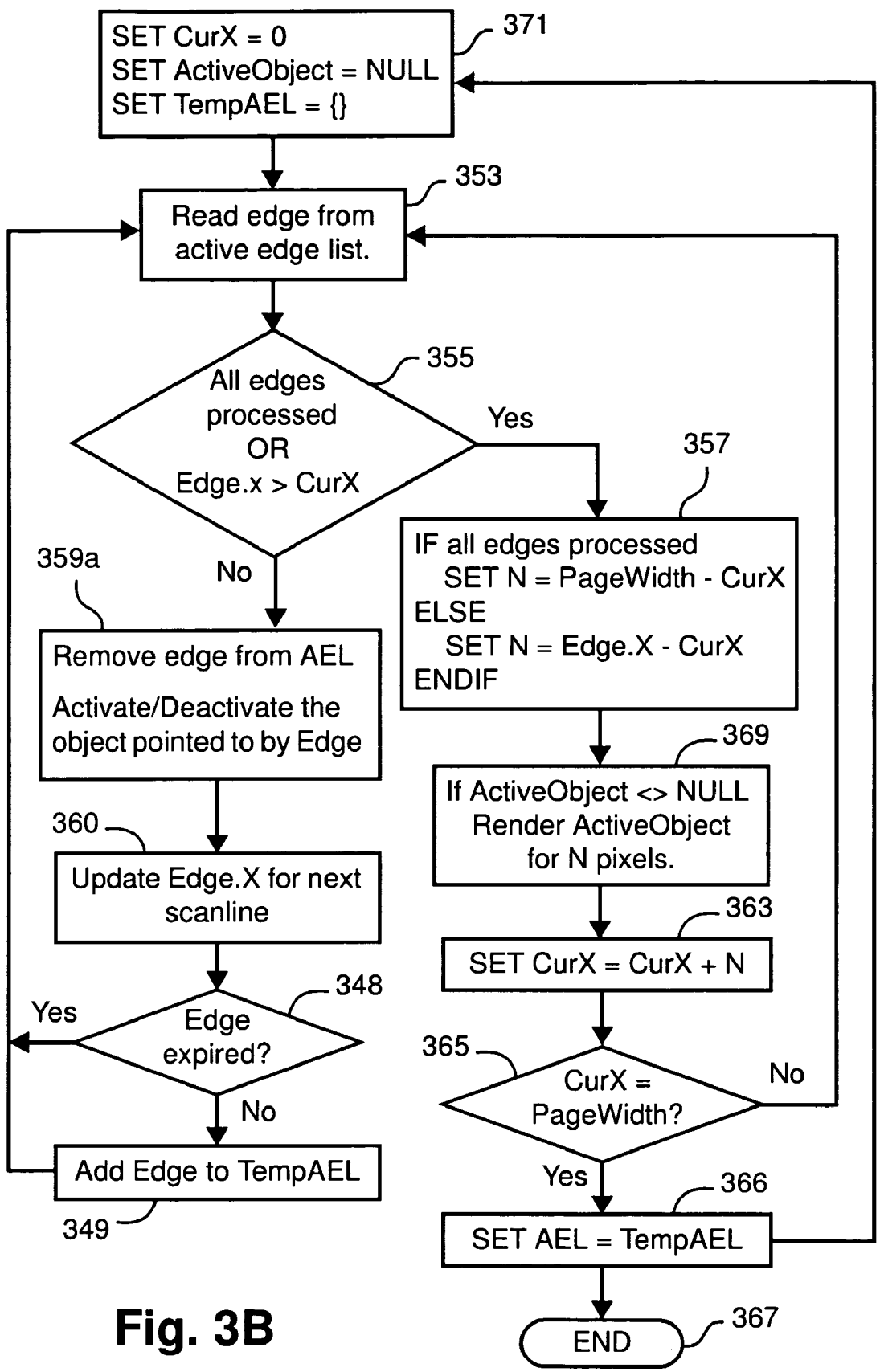
FIG. 3B is a flowchart of an alternative method for rendering a scanline from the active edges calculated by the method steps of FIG. 2.

For the Painter's Algorithm render method, step 257 of FIG. 2 invokes FIG. 3B to render the active-edge list for a run of N scanlines. The process of FIG. 3B is similar to the process of FIG. 3A except that in a PARM, only one object is active and thus there is no need to process an active-object list. Thus, the initialization step 351 is replaced in FIG. 3B by step 371, which sets the active object to NULL rather than setting an active object list to a NULL set. Step 361 in FIG. 3A (which calls the steps of FIG. 4), is replaced in FIG. 3B by step 369, in which the renderer 1511 when implementing a PARM renders N pixels using the fill of the (single) object that is active.

Step 359a in FIG. 3B is similar to step 359 in FIG. 3A except that there is no need to update the active object list.

When activating/deactivating the object, the method of FIG. 7 is used, except that steps 771 and 773 are simpler in that they merely set or clear the Active flag for the object respectively.

4.1 Differences Between PSRM and PARM

Some differences between the Painter's Algorithm rendering method (PARM) and the pixel-sequential rendering method described above may be summarized as follows:

(a) In a PARM, an object is typically rendered as soon as the object is received from the GDI layer 1503, whereas a PSRM does not start rendering until the last object is received;
(b) The display list of a PARM has only one object, whereas all objects to be rendered are in the display list of a PSRM;
(c) In a PARM, only pixel runs where the object is active are rendered to the framestore, whereas the PSRM typically renders white (the color of the page) when no objects are active;
(d) In a PARM, compositing is only performed between the object and the framestore, whereas a PSRM composites all contributing active objects over a pixel run and writes the result to the framestore; and
(e) In a PARM, a clipping region is processed for each object it is associated with, whereas a PSRM clips all objects at once.

In an image having three objects clipped by a clip region C1, a PARM processes clip C1 three times, once for each of the three objects. In a PSRM clip C1 is only added to the display list once. The clip C1 has a level list that points to each of the three objects. Each object has a clip count of 1, ensuring the object is clipped during rendering.

Compositing in a PARM is a problem when the framestore holds pixel values at a lower bit-depth than the bit-depth of the object requiring compositing. For example, if the framestore contains 1 bit per pixel CMYK halftoned pixel values, and an object is expecting to be composited onto 32 bit per pixel RGBA pixel values, there will be a loss of information when compositing.

5.0 First Arrangement: Rendering Using PSRM and PARM

A first rendering arrangement is described with reference to FIG. 14. The first arrangement involves a hybrid approach, in which both a Painter's Algorithm render method and the pixel-sequential method described above are used by the renderer 1505.

As seen in FIG. 15 the display list generation module 1507 generates an edge-based display list 1509. In the list, each edge is assigned an object-identifier edge.ID that indicates the object to which the edge belongs.

An object requires compositing if the object has a compositing operator that requires the pixels of the object to be combined in some way with pixels beneath the object. As objects are added to the display list, the display list generation module 1507 keeps track of the last object requiring compositing. This is called the last-compositing-object. Once all objects are added to the display list, the rendering module 1511 starts rendering.

Figure 14:
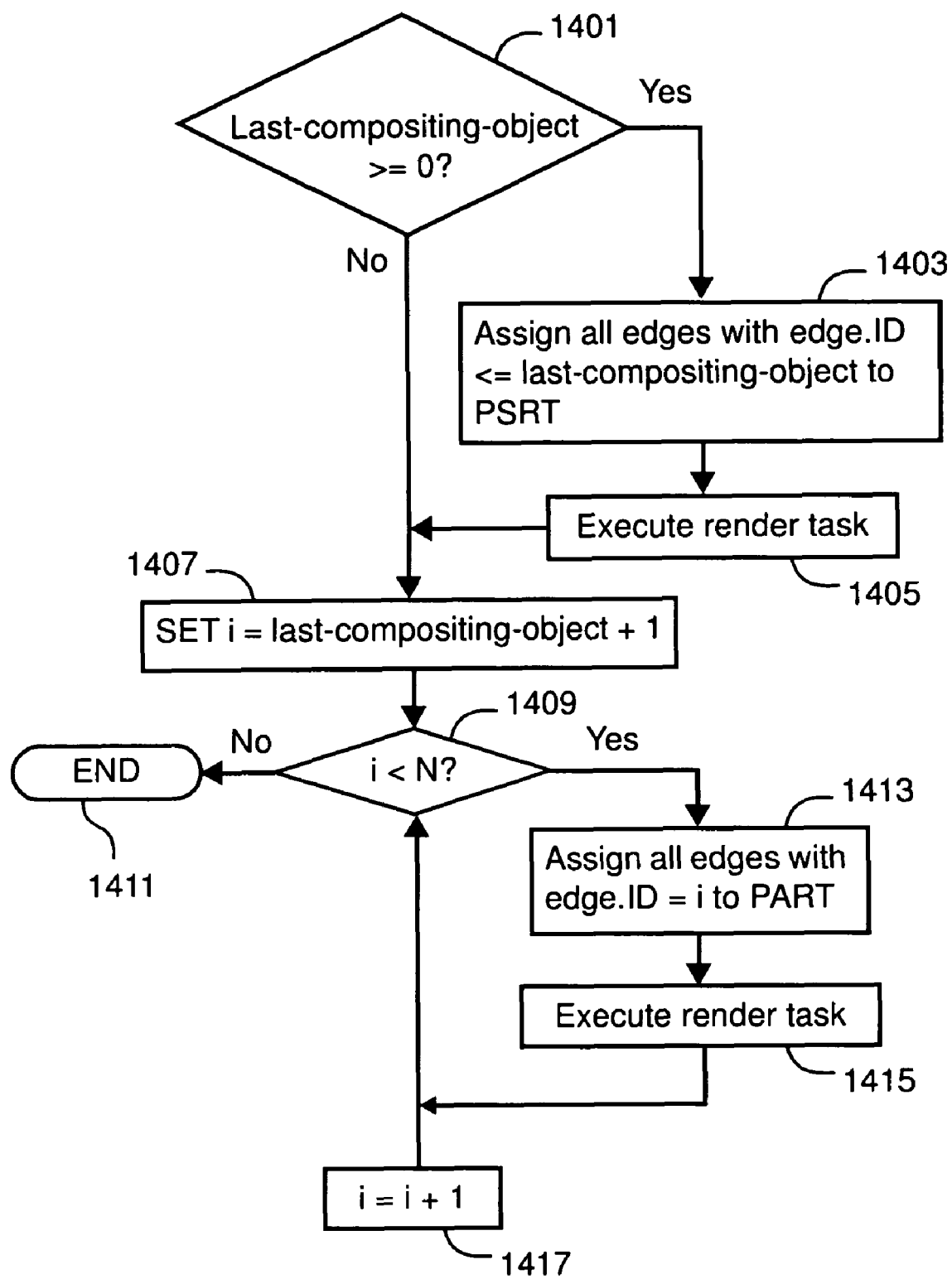
FIG. 14 is a flowchart of a first rendering arrangement that uses a pixel sequential rendering method and a Painter's Algorithm render method (PSRM and PARM)

The method of FIG. 14 is described in terms of render tasks. A render task (RT) is a task that when executed renders a portion of the edge-based display list according to a specified rendering method. A render task is assigned a set of edges from the main display list. The edges are stored in the render task's own local main-edge list and local active-edge list. A render task that utilizes a PARM is called a PART (Painter's Algorithm Render Task). A render task that utilizes a PSRM is called a PSRT (Pixel-Sequential Render Task).

In the first arrangement the rendering module 1511 assigns all edges between the first object in the display list and the last-compositing-object to a pixel-sequential rendering task (PSRT) which utilizes the PSRM described above. The render task executes and renders the set of edges, including white space, to the framestore.

Then for each remaining object in the display list, the edges of the object are assigned to a Painter's Algorithm rendering task (PART) which utilizes the PARM described above. The render task executes and renders the set of edges, excluding white space, over the framestore.

Thus, a pixel-sequential rendering method is applied to any objects requiring compositing, and then remaining (opaque) objects are simply rendered over the framestore.

Referring to FIG. 14, in step 1401 the rendering module 1511 checks whether the last compositing object is greater than or equal to zero. If so (the YES option of step 1401) then in step 1403 the rendering module 1511 assigns all edges with edge.ID<=last_compositing_object to a pixel-sequential render task. Then, in step 1405, the render task is executed using the method steps described in FIGS. 2, 3A, 4 and 7.

Next, in step 1407, the index i is set to (last-compositing-object+1). In step 1409 the renderer checks whether i is less than N. If this is not the case (the NO option of step 1409) then there are no more objects to process and the procedure terminates in step 1411. If, however, i is less than N, process flow proceeds to step 1413, which assigns all edges having edge.ID equal to i to the Painter's Algorithm Render Task. Then, in step 1415 the render task is executed using the steps of FIGS. 2, 3B, and 7.

After the render task is complete, step 1417 increments index i by one and the method returns to step 1409 to check whether there are any further objects to process.

Where the last-compositing-object is not greater than or equal to 0 (the NO option of step 1401), process flow proceeds directly to step 1407, bypassing steps 1403 and 1405. In this case the pixel-sequential rendering is not required and all objects in the display list may be rendered using a PART.

The rendering method of the first arrangement is summarized in the following pseudo code, with reference to FIG. 14:

```
IF last-compositing-object >= 0
    Assign all edges with (edge.ID <= last-compositing-object) to
PSRT.
    Execute render task using Fig 2 (PSRM)
ENDIF
SET i = last-compositing-object + 1
WHILE i < N
    Assign all edges with (edge.ID = i) to PART.
    Execute render task.
    i = i + 1
ENDWHILE
```

Using this method to render a page of 36,000 objects onto a 1 bpp halftoned monochrome framestore, where the last compositing object was 5, the render time was halved from 6 seconds to 3 seconds on a Pentium III 667 MHz with 256 MB RAM compared with a standard PSRM.

It will be clear to those skilled in the art that where the rendering module 1511 is implemented on a machine having multiple processors, each PART can be rendered in a separate thread. When the next object considered in the display list does not overlap with a currently-executing PART, then a new thread can be created to render the newly-considered object.

This process continues until either all objects are rendered, or an object is found to overlap a currently-executing PART.

6.0 Modified Painter's Algorithm (IPARM)

Two methods are proposed to improve the PARM described above. The first modification relates to treating consecutive non-overlapping opaque objects, and the second relates to the clipping of multiple consecutive objects.

6.1 Consecutive Non-Overlapping Opaque Objects

A Painter's Algorithm Render Method can in fact process many objects at once, providing the objects do not have overlapping bounding boxes. As long as bounding boxes do not overlap, edge sorting movements only occur locally within each object's edges.

Figure 5A:
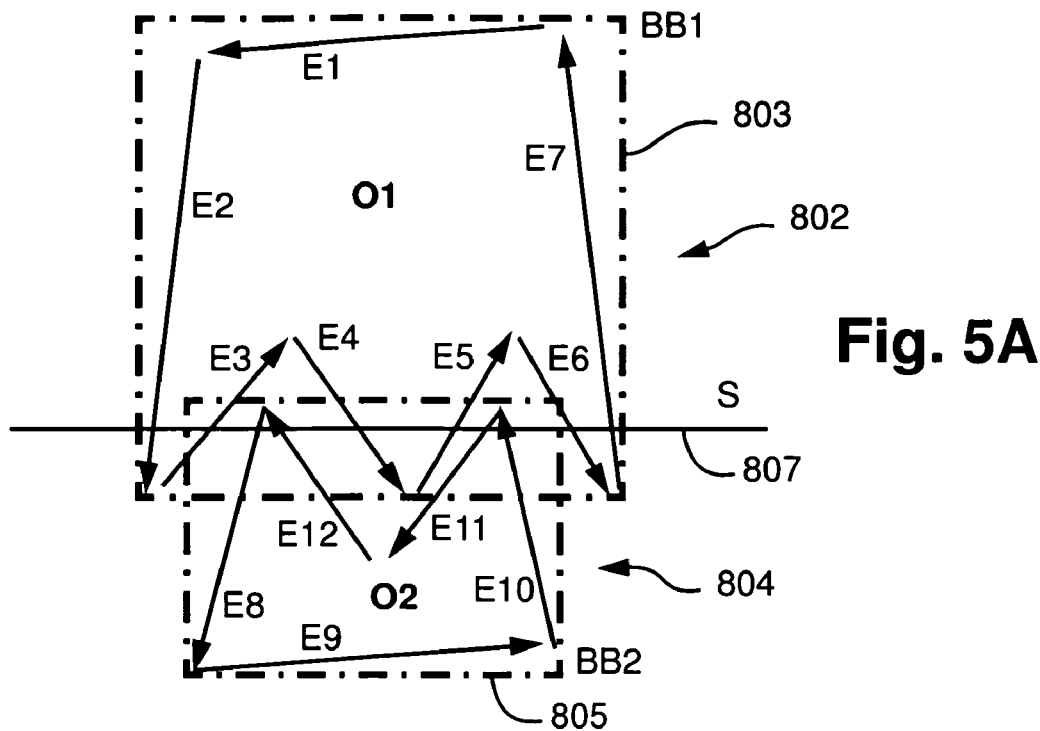
FIG. 5A shows an example of two objects that overlap by bounding box.

For example, FIG. 5A shows two objects that have overlapping bounding boxes, even though the objects themselves do not overlap. Object 802 is a polygon having bounding box 803. Object 802 is made up of edges E1, E2, E3, E4, E5, E6 and E7, with edges E3 to E6 arranged in a saw-tooth pattern.

Object 804 is a polygon having bounding box 805. Object 804 is formed by the sequence of edges E8, E9, E10, E11, and E12. Edges E11 and E12 are arranged in a saw-tooth manner, and the peak formed by edges E8 and E12 is positioned in the hollow formed by edges E3 and E4. The peak formed by edges E11 and E10 of object 804 is positioned in the hollow formed by edges E5 and E6 of object 802. Although object 804 does not meet or intersect object 802, the bounding box 805 overlaps the bounding box 803.

Thus, when rendering objects 802 and 804 together, it can be seen that at scanline 807, edges E8, E12, E11 and E10 of object 804 must be merged into the active edge list {E2, E3, E4, E5, E6, E7}, resulting in edge list {E2, E3, E8, E12, E4, E5, E11, E10, E6, E7}.

Figure 5B:
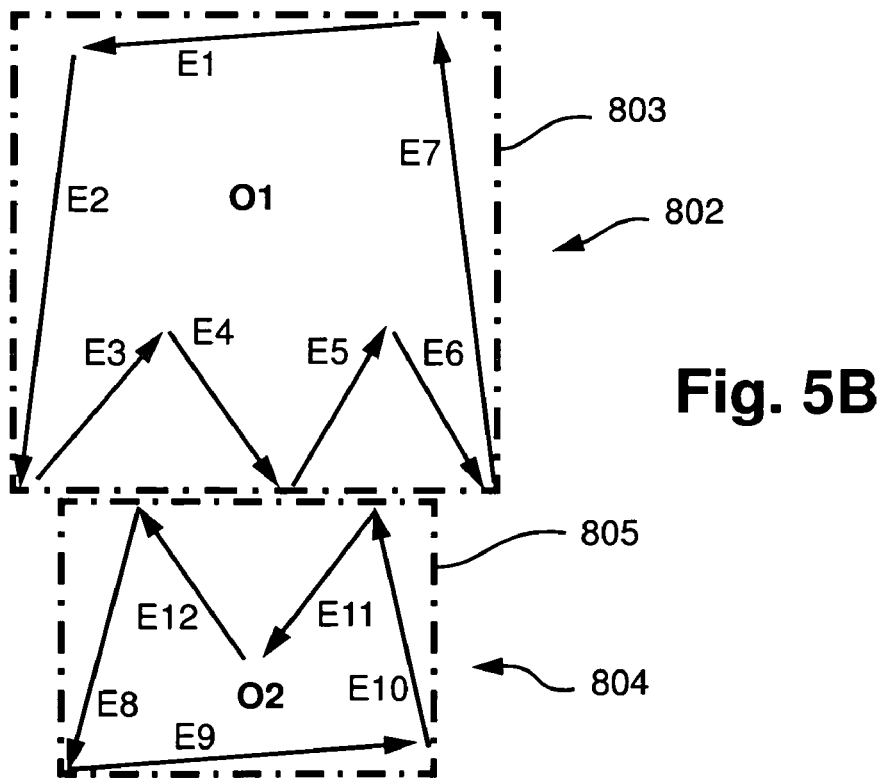
FIG. 5B shows two objects that do not overlap by bounding box.

In FIG. 5B, object 804 has been moved away from object 802 such that the bounding boxes 803, 805 no longer overlap. At no time will edges E8, E12, E11, E10 ever be merged with edges E2, E3, E4, E5, E6, E7.

It has been found that rendering several objects assigned to a PART, where no two objects overlap by bounding box, is at least as fast as rendering each object separately. In the improved PARM (or IPARM), separate groups of consecutive opaque objects not overlapping by bounding box are preferably assigned to separate PARTs.

6.2 Clipping of Multiple Consecutive Objects

Where multiple consecutive objects are clipped by one or more clipping regions, in a typical PARM each object is clipped and rendered. This can be inefficient when the clipping region is a complex path. Performance can be improved when a PART utilizes a PSRM to render a group of objects that are clipped by a clipping region. This ensures that a clip is processed only once.

6.3 Procedure for IPARM

The modified PARM utilizes the active edge list determination method described in FIG. 2 and the method of rendering a scanline described with reference to FIG. 3A. The IPARM also uses the object activation described with reference to FIG. 7.

Figure 8:
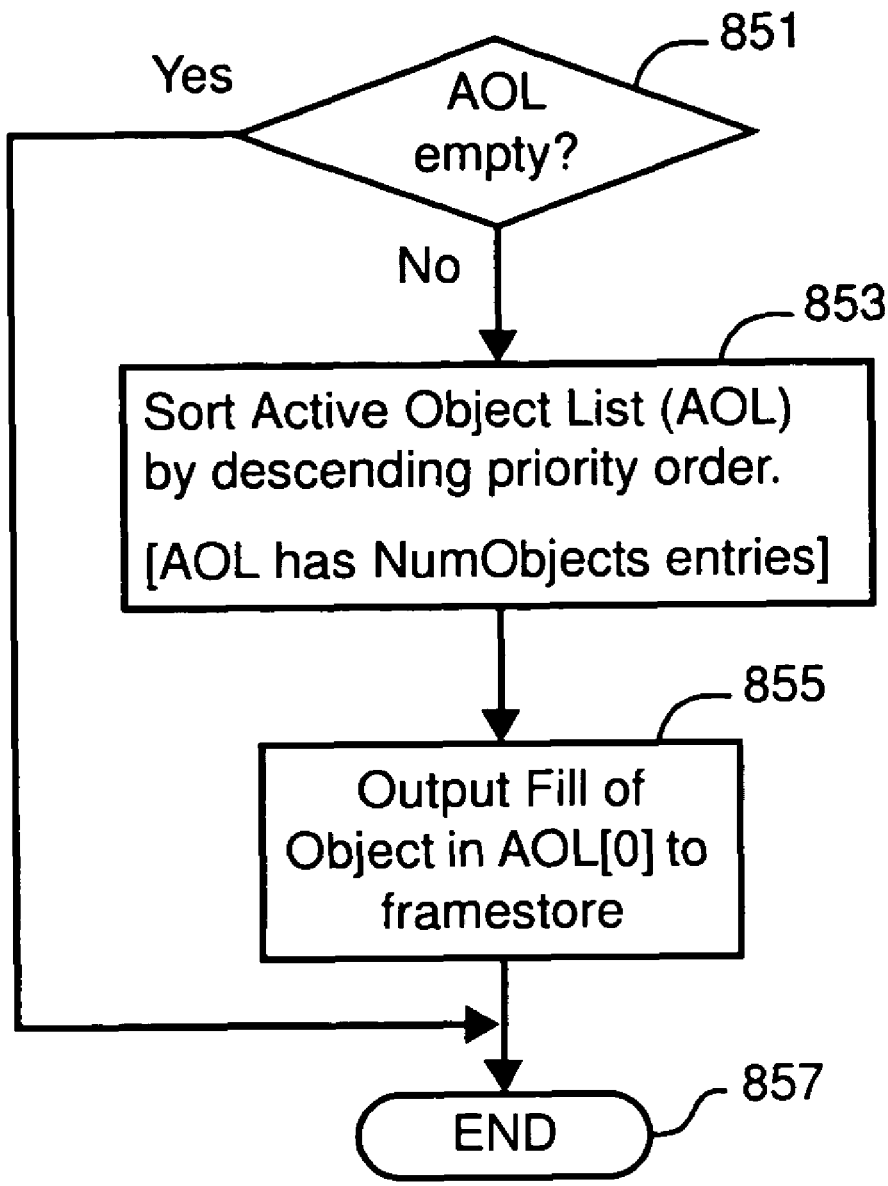
FIG. 8 is a flowchart of a method for determining which objects contribute to a pixel run in an improved Painter's Algorithm render method (PARM)

In step 361, the IPARM renders the Active Object List for N pixels. For the IPARM, such rendering is shown in FIG. 8. The input to the method of FIG. 8 is a set of active objects. In step 851 the renderer checks whether the active object list (AOL) is empty. If so, the procedure terminates in step 857 and control flow returns to FIG. 3A. This is because the IPARM does not render whitespace.

If the AOL is not empty (the NO option of step 851), then in step 853 the active object list is sorted by descending priority value. The first entry in the list has the active object with the highest priority. This is because only opaque objects are submitted to the improved PARM. Execution proceeds to step 855, which outputs the fill of the object at AOL[0] to the framestore. The routine ends at step 857.

A render task (RT) based on the improved PARM (IPARM) is called an IPART. An IPART may be used to render the following types of data:
1. Consecutive non-overlapping opaque objects.
2. A set of clips plus all opaque objects being clipped by the clips, providing all objects being clipped are opaque.

7.0 Second Arrangement: Rendering Using PSRM and IPARM

A second rendering arrangement used by the rendering module 1511 combines the pixel-sequential rendering method described above with the IPARM of Section 6.0. All objects between the first object and the last-compositing-object are rendered using a PSRM, as in the first arrangement. All subsequent objects are guaranteed to be opaque, and are hence suitable candidates to be rendered by the improved PARM (IPARM). In the second arrangement, consecutive non-overlapping objects are grouped for rendering by an IPART.

7.1 Second Arrangement: Object List

In the preferred implementation of the IPARM, a new list, called the object list, is maintained. An entry is added to the object list as each object is processed and added to the edge-based display list by the Display List Generator 1507. Each entry in the object list contains:
- start and end indices referring to the edge list describing the object;
- the bounding box of the object; and
- a flag to indicate if the object requires compositing.

Where a set of objects is clipped by one or more clips, the complete set of edges between the first clip and the last object being clipped is considered to be a single object. In this case, the bounding box is the union of all bounding boxes of the set of objects and the one or more clips.

Thus, for example, the main edge list {E1, E2, E3, E4, E5, E6} of clips 650, 652 and rectangle 654 in FIG. 6A is taken to be a single object.

For objects 802 and 804 in FIG. 5A, the main edge list is {E1, E2, E3, E4, E5, E6, E7, E8, E9, E10, E11, E12} and the object list has two entries:
- entry one has start index=0 (referring to edge E1), end index=6 (referring to edge E6), bounding box=BB1 (ie box 803), compositing-flag=FALSE.
- entry two has start index=7, end index=11, bounding box=BB2 (ie box 805), compositing-flag=FALSE.

7.2 Second Arrangement: Display List Generation

Figure 9A:
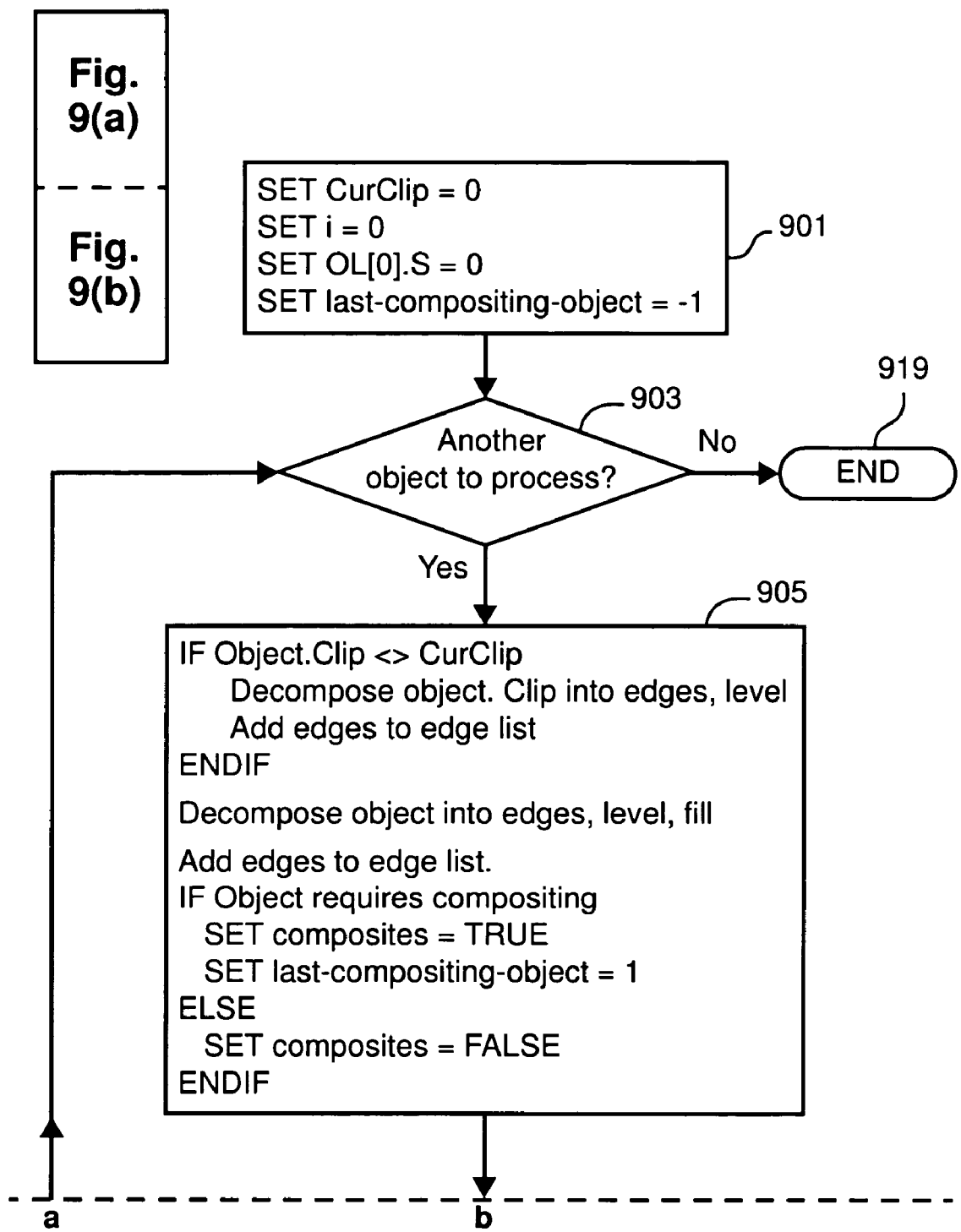
FIGS. 9(a) and 9(b) show a flowchart of a method that describes how an object list is constructed during display list generation for the second and third arrangements.
Figure 9B:
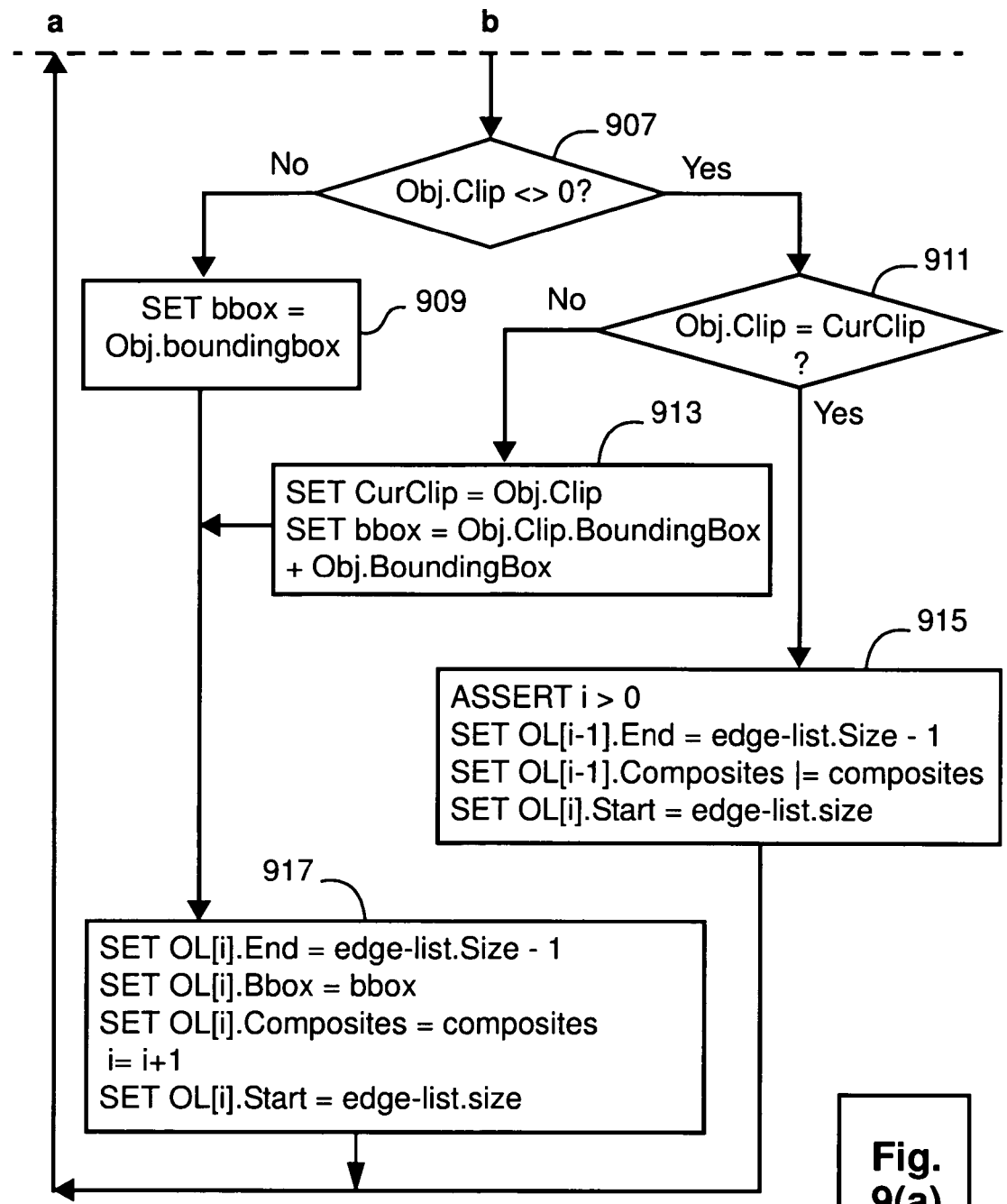

FIGS. 9(a) and 9(b) illustrate the generation of a display list and the corresponding object list for use with the second arrangement. The method assumes that an object can only be clipped by one clip. A clip is considered to be a property of the object to be rendered. This is common in systems such as MS Windows GDI. The steps of FIGS. 9(a) and 9(b) are performed by the display list generation module 1507.

In step 901, module 1507 sets the current clip CurClip to NULL and initializes the last-compositing-object to negative one (−1). The counter i is set to zero and the first entry in the object list, OL[0], is assigned the following value:

OL[0].Start=0

Execution proceeds to step 903, which checks whether there are any further objects to process. If there are no more objects to process for the page (the NO option of step 903), then execution terminates in step 919. Otherwise (the YES option of step 903), execution proceeds to step 905, in which the clip of the object (if one exists) is decomposed into edges and level data, and the object is decomposed into edges, level data and fill data. Module 1507 adds the edges to the edge list. If the object requires compositing, then the variable "composites" is set to TRUE and the last-compositing-object is set to the counter i. Otherwise, if the object does not require compositing, then the variable "composites" is set to FALSE.

Next, in step 907 module 1507 checks whether the object has a clip. If the object does not have an accompanying clip, then execution proceeds to step 909, in which the variable "bbox" is set to the bounding box of the object to be drawn. Then, in step 917, the ith entry in the object list, OL[i] is assigned the following values:

OL[i].End=the current size of the edge list minus one.
OL[i].BBox=the variable "bbox".
OL[i].Composites=the variable "composites"

The counter i is incremented by one, and the ith entry in the object list, OL[i] is assigned the following values:

OL[i].Start=the current size of the edge list.

After step 917, execution returns to step 903 to determine whether there are further objects to process.

If, in step 907, the object has an accompanying clip (the YES option of step 907), then execution proceeds to step 911, in which the accompanying clip is compared against the variable "CurClip". If the clips are equal (the YES option of step 911), then execution proceeds to step 915.

In step 915, the "i minus one" entry in the object list, OL[i−1] is updated with the following values:

OL[i−1].End=the current size of the edge list minus one.
OL[i−1].BBox=the combined bounding box of OL[i−1].BBox and the object's bounding box Obj.BoundingBox.
OL[i−1].Composites=the result of the value of OL[i−1].Composites bitwise ORed with the value of "composites". This ensures that OL[i−1].Composites remains TRUE even if the current object does not require compositing.

Module 1507 then updates the $i^{th}$ entry in the object list, OL[i] with the following values:

OL[i].Start=the current size of the edge list.

Execution proceeds to step 903 until all objects have been processed.

If at step 911 the accompanying clip does not equal the current clip "CurClip" (the NO option of step 911), then execution proceeds to step 913. At step 913, the variable CurClip is set to the accompanying clip value, "Obj.Clip". The variable bbox is set to the combined bounding box of the object and the clip. Then execution proceeds to step 917, as described above. Execution proceeds to step 903 until all objects have been processed.

At the end of step 919, the output is an unsorted main edge list, and a corresponding object list. In addition, the last-compositing-object has been identified. The total number of objects in the display list is the value of the counter "i".

7.3 Second Arrangement: Rendering Method

Figure 16:
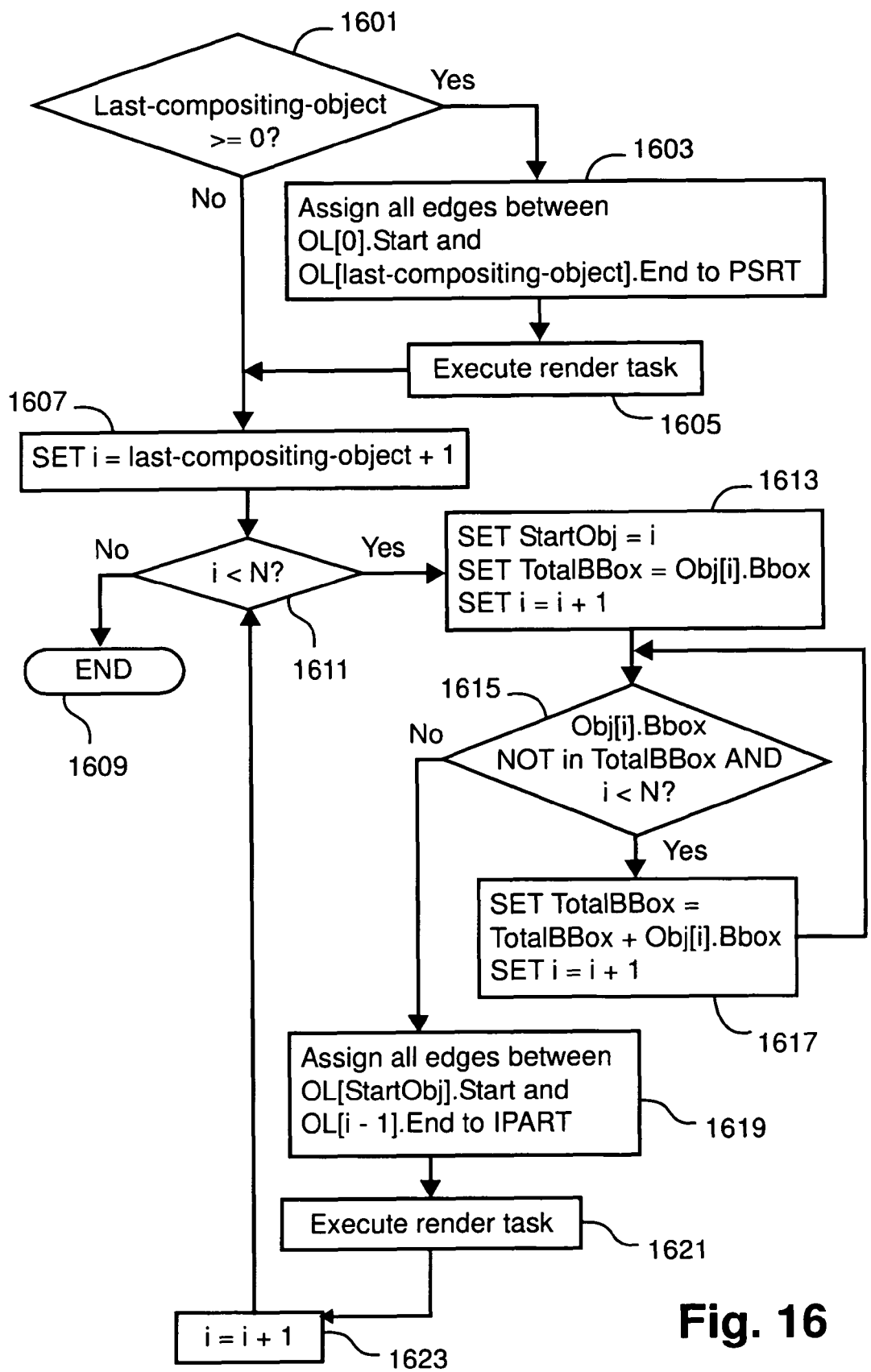
FIG. 16 is a flowchart of a second rendering arrangement that uses a pixel sequential rendering method and an improved Painter's Algorithm render method (PSRM and IPARM)

The rendering method of the second arrangement is illustrated in FIG. 16. In step 1601 the rendering module 1511 checks whether the last-compositing-object is greater than or equal to zero. If so, then in step 1603 module 1511 assigns all edges between OL[0].Start and OL[last-compositing-object]. End to a PSRT. Then, in step 1605, the render task is executed using the steps of FIGS. 2, 3A, 4 and 7. Execution then proceeds to step 1607.

If the last-compositing-object is not greater than or equal to zero (the NO option of step 1601) then the PSRT is not required and execution proceeds directly to step 1607, bypassing steps 1603 and 1605.

In step 1607, the module 1511 sets the index i to the last-compositing-object plus one. Then step 1611 checks whether i is less than N, the number of objects. If there are no more objects to render (the NO option of step 1611), then rendering terminates in step 1609. If there are still objects to process, then in step 1613 module 1511 sets the following values:

StartObj=i

TotalBBox=Obj[i].Bbox $i=i+1$.

Step 1615 then checks whether Obj[i].Bbox is NOT in TotalBbox and i is less than N. If these conditions are satisfied (the YES option of step 1615) then execution proceeds to step 1617, which sets the following values:

TotalBbox=TotalBbox+Obj[$i$].Bbox $i=i+1$

Execution then returns to step 1615.

If the conditions in step 1615 are not satisfied (the NO option of step 1615), then in step 1619 module 1511 assigns all edges between OL[StartObj].Start and OL[i−1].End to an IPART. In step 1621 the module 1511 executes the render task using the steps of FIGS. 2, 3A, 7 and 8. Then in step 1623 the index i is incremented by one and execution returns to step 1611 to check whether further objects remain to be processed.

The rendering method of the second arrangement is summarized in the following pseudo-code:

```
IF last-compositing-object >= 0
    Assign all edges between
        OL[0].Start and
        OL[last-compositing-object].End to PSRT.
    Execute render task.
ENDIF
SET i = last-compositing-object + 1
WHILE i < N
    SET StartObj = i
    SET TotalBBox = OL[i].BBox
    i = i + 1
    WHILE (OL[i].BBox NOT IN TotalBBox) AND (i < N)
        SET TotalBBox = TotalBBox + OL[i].BBox
        i = i + 1
    ENDWHILE
    Assign all edges between
        OL[StartObj].Start and
        OL[i − 1].End to PART.
    Execute render task.
ENDWHILE
```

Figure 10A:
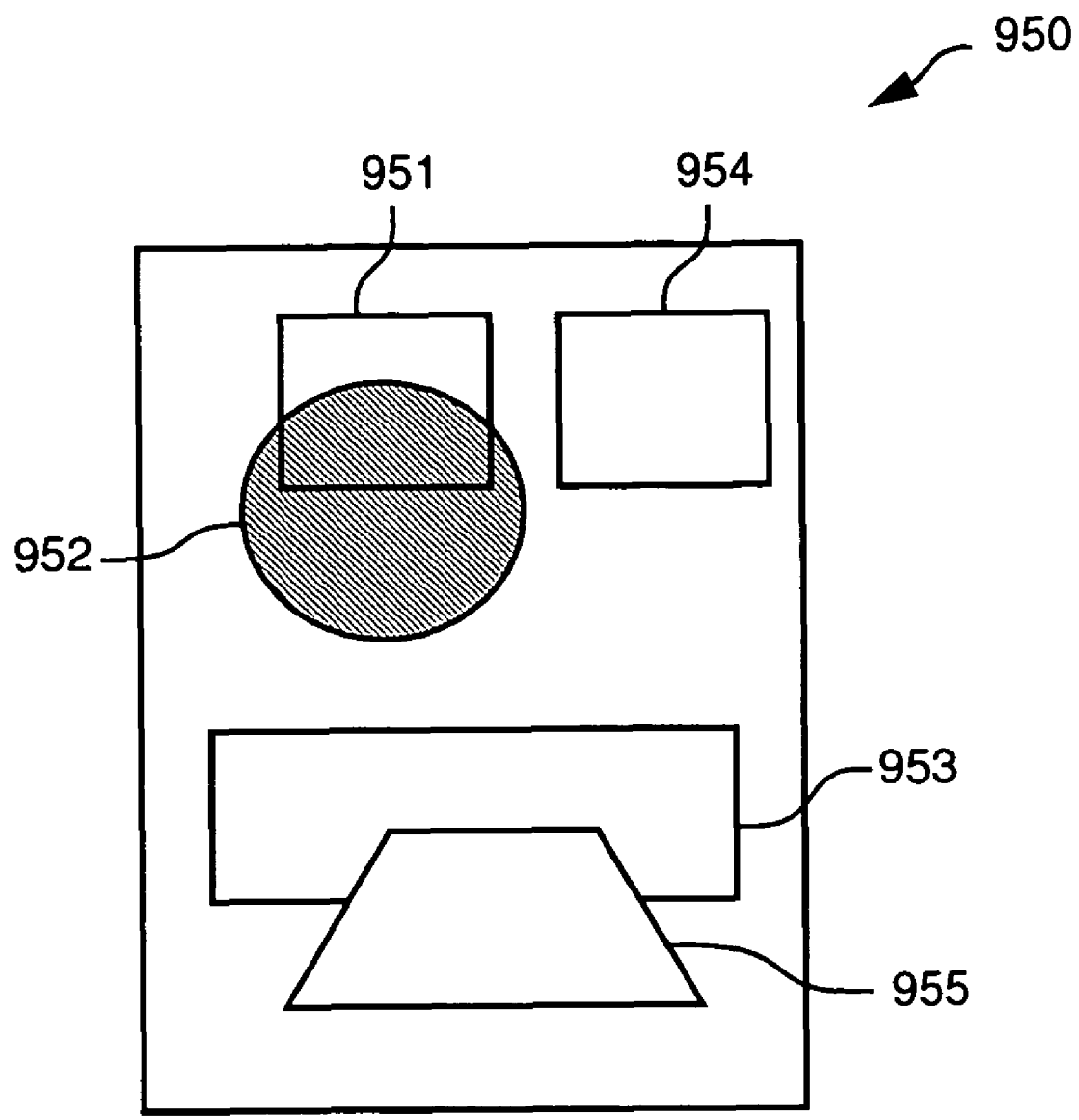
FIG. 10A shows an image with five objects on a page.

An example is shown in FIG. 10A, in which an image 950 is made up of five objects 951, 952, 953, 954 and 955 (in ascending priority order). The last compositing object is 952.

Rectangle 951 is positioned in the top left of image 950. The semi-transparent ellipse 952 partially overlays rectangle 951 but does not touch any of the other objects. Rectangle 954 is positioned in the top right of image 950 and does not intersect any of the other objects. Opaque rectangle 953 is located in the bottom half of image 950, and opaque trapezoid 955 partially overlays the rectangle 953.

Figure 10B:
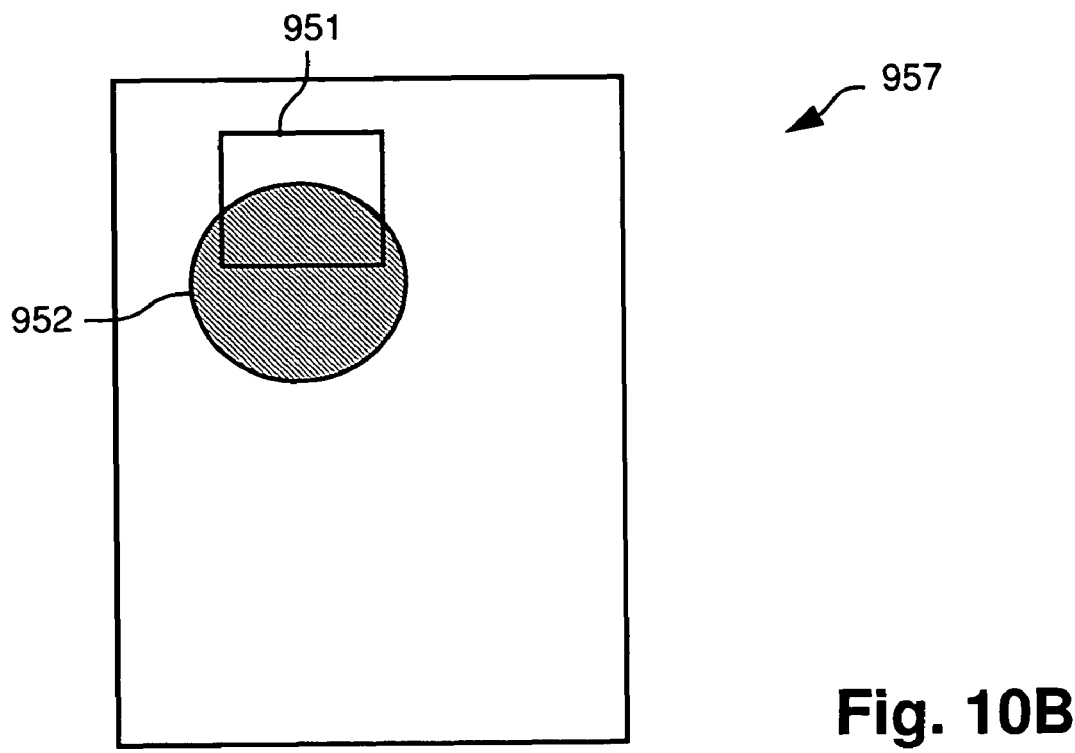
FIGS. 10B, 10C and 10D show how the objects of FIG. 10A are rendered in three render tasks.

In the second arrangement, the set of edges for objects 951 and 952 is rendered to the framestore using the pixel-sequential rendering method. This first render task 957 is shown in FIG. 10B.

Figure 10C:
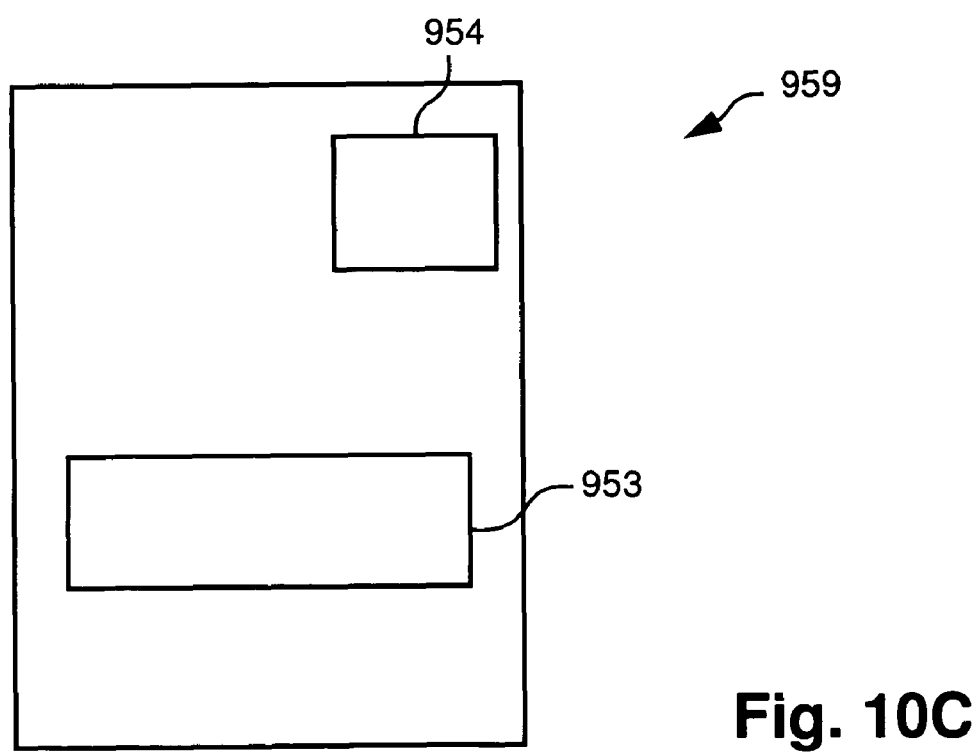

Objects 953 and 954 do not overlap by bounding box, but object 955 overlaps the combined bounding box of objects 953 and 954. Accordingly, the edges of objects 953 and 954 are assigned to a first PART 959 as illustrated in FIG. 10C. Task 959 renders objects 953 and 954 onto the framestore.

Figure 10D:
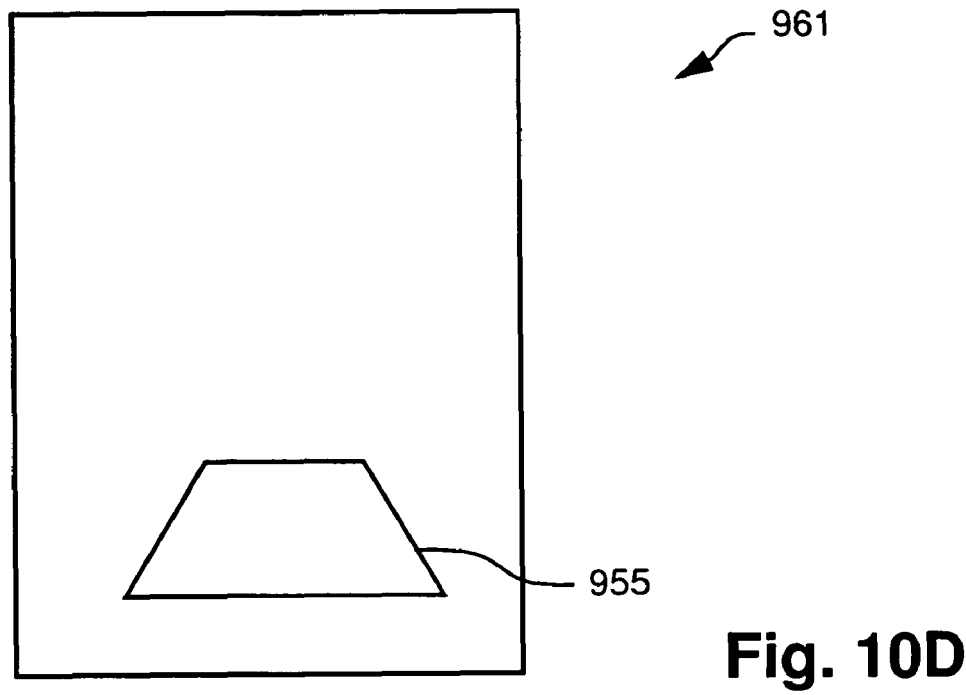

Finally, a separate PART 961 is used to render object 955 onto the framestore, as illustrated in FIG. 10D.

7.4 Banding

In some cases the full framestore is available, such as may be the case when the target is a 1 bit per pixel monochrome halftoned output. A framestore for this output requires approximately 4 MB for an A4 page at 600 dots per inch (DPI). At higher DPIs or on larger pages, or greater bit-depths, such as 4 bpp CMYK, it may only be possible to allocate a band of pixels-per-line equal to the page width, and a maximum number of scanlines equal to some number much less than the page height, for example 256 scanlines.

Where the full framestore is available, render tasks can fully execute in sequence. For example when processing image 950, the PSRT 957 is executed and all pixels rendered to the framestore. Then each remaining IPART 959, 961 is executed and the objects 953-955 are rendered to the framestore. Where consecutive IPARTs do not overlap, each IPART can be rendered in parallel.

Where only a band store is available, then the tasks partially execute in sequence, such that only that part of the task that is visible on the current band is rendered. Where consecutive IPARTs do not overlap within a band, each IPART can render in parallel.

In the example of FIG. 10A there are three render tasks. Task 957 renders objects 951 and 952. Task 959 renders objects 953 and 954, and Task 961 renders object 955.

Figure 10E:
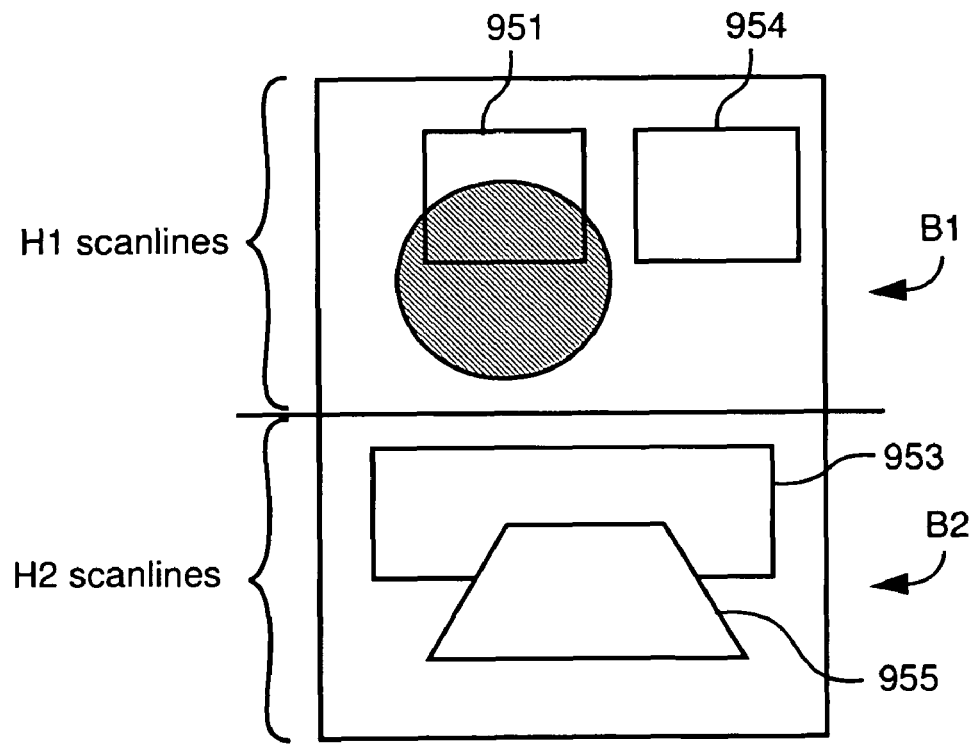
FIG. 10E shows the page of FIG. 10A rendered in two bands.

If the page is divided into two bands, B1 and B2, as in FIG. 10E, then for band B1, tasks 957 and 959 are active. Task 957 is rendered onto the band store for H1 scanlines, and then Task 959 is rendered onto the band store for H1 scanlines. The band store is then sent to the printer. A task persists in memory until all edges have been processed. Task 957 is completed inside band B1, but task 959 has further edges still to be processed (for object 953). On the second band B2, task 961 is active. Task 959 is rendered onto the band store, and then task 961 is rendered onto the band store. The band store is then sent to the printer.

This method of banding can be applied to all rendering methods described in the present specification.

8.0 Exclusive Pixel-Sequential Rendering Method (XPSRM)

The rendering method of the second arrangement is useful when the number of the last compositing object is small compared to the overall number of objects in the display list. In the worst-case scenario, if the last object in the display list requires compositing, then in the second arrangement all objects will be rendered using a PSRM. It is often the case that objects requiring compositing are contained within localized areas and do not overlap large numbers of objects.

A modified PSRM, called an exclusive pixel-sequential render method (XPSRM), is now described in which only the pixels for nominated objects are output.

In an XPSRM, a new member is added to the level data structure. This member is called ExclusiveOutput. A pixel run is only emitted when the active object list (AOL) contains at least one object whose ExclusiveOutput member is set to the value one (1). The AOL itself has a new member called ExclusiveCount. When an object is inserted into the AOL, the AOL.ExclusiveCount is incremented by object.ExclusiveOutput. When an object is removed from the AOL, the AOL.ExclusiveCount is decremented by object.ExclusiveOutput.

Figure 12:
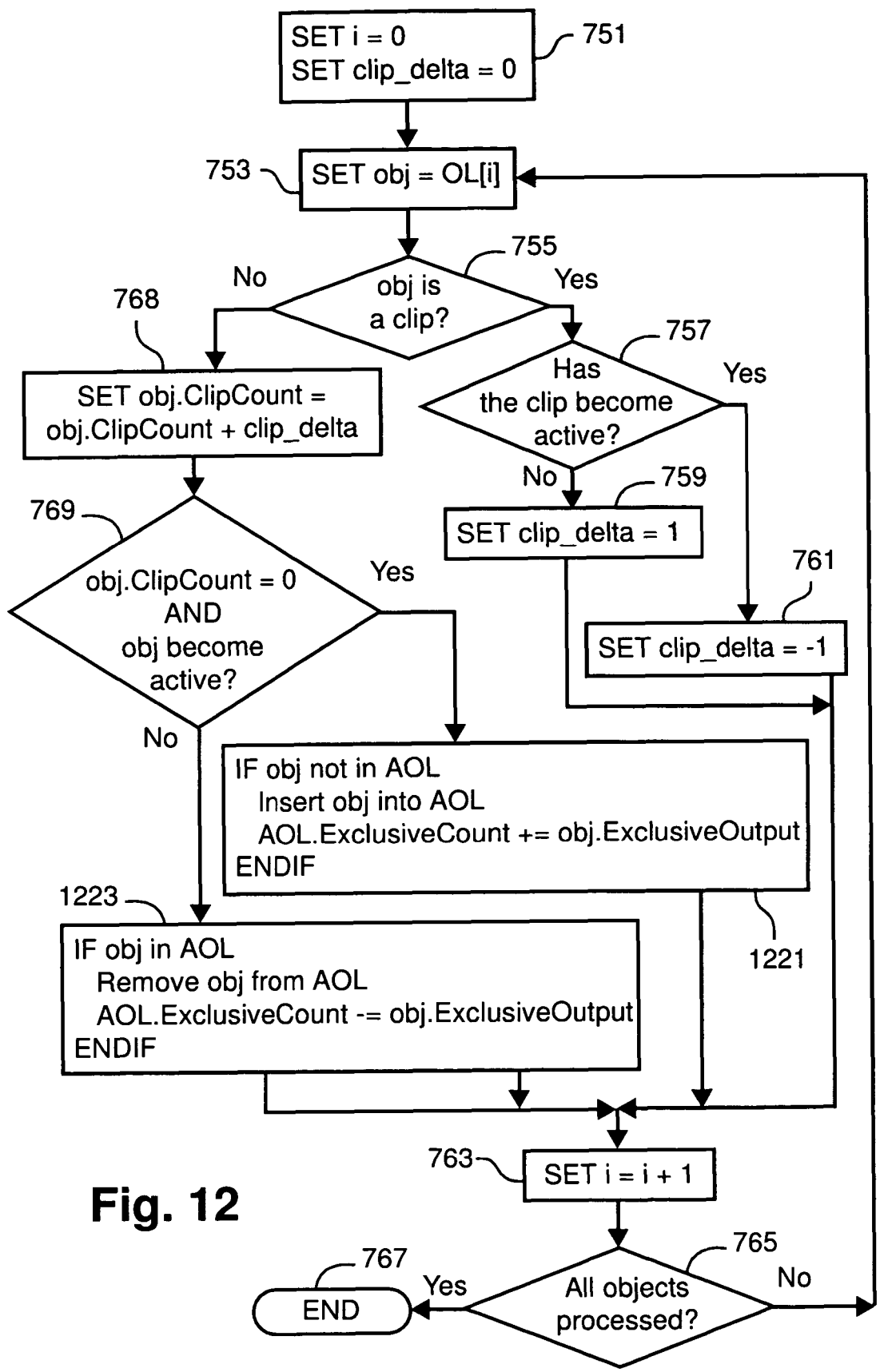
FIG. 12 is a flowchart of a method for activating objects that shows how the ExclusiveCount member of the active object list is incremented in an XPSRM when an object is activated, and decremented when an object is deactivated.

The XPSRM determines the active edge list using the determination method described in FIG. 2 and the method of rendering a scanline described in FIG. 3A. The method of activating objects (taking clipping into account) used by the XPSRM is shown in FIG. 12, which is a modified version of the method shown in FIG. 7.

Figure 13:
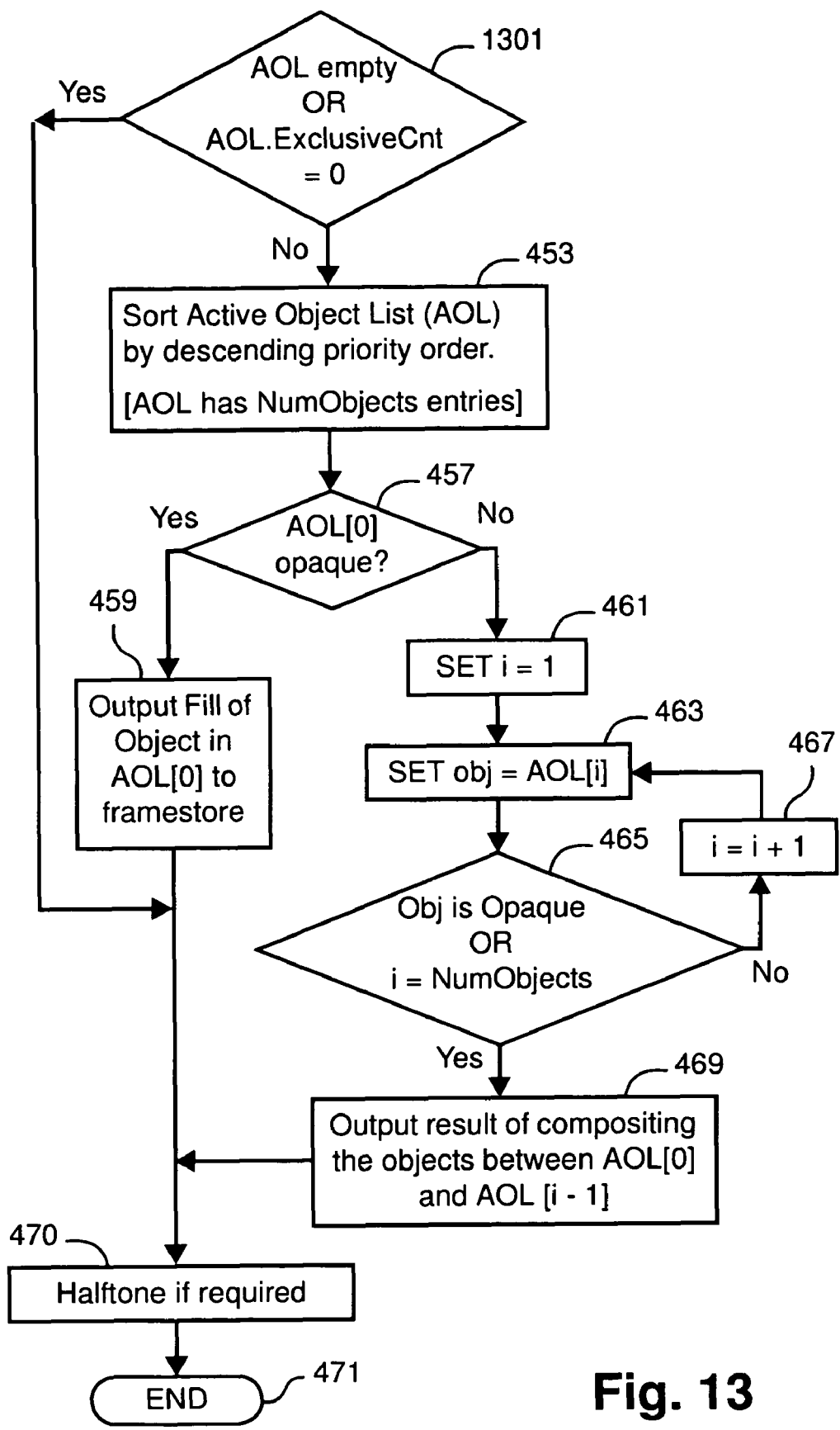
FIG. 13 is a flowchart of a method for determining which objects contribute to a pixel run in an XPSRM.

The XPSRM's method of determining which objects contribute to a pixel run is shown in FIG. 13, which is a modified version of FIG. 4.

The method of FIG. 13 includes many of the steps of FIG. 4. Specifically, the branch made up of steps 453, 457, 459, 461, 463, 465, 467, 469, 470 and 471 is unchanged. The initial step 451 is replaced in FIG. 13 by step 1301, which checks whether "AOL empty OR AOL.ExclusiveCount=0". If this condition is not satisfied (the NO option of step 1301), execution proceeds to step 453 and the branch made up of steps 453-471 executes.

If the condition of step 1301 is satisfied, then execution proceeds directly to step 471. Thus a second change from the method of FIG. 4 is that step 455 (outputting white) is omitted in the XPSRM. Thus, the XPSRM does not output any pixels either if the active object list is empty, or the active object list contains no objects whose ExclusiveOutput member has been set.

A modified version of the object activation/deactivation routine of FIG. 7, is described in FIG. 12. The methods of FIGS. 7 and 12 are the same with the exception of steps 1223 and 1221, which replace steps 773 and 771 respectively. Steps 1223 and 1221 include the additional task of incrementing or decrementing the new member of the active object list, AOL.ExclusiveCount.

The input to FIG. 12 is as for FIG. 7, that is an Active Object List and a list of level data structures pointed to by the current edge. The output of FIG. 12 is a modified Active Object List (AOL) and a possibly modified ExclusiveCount variable.

Step 1223, which replaces step 773, removes obj from the AOL (if obj is in the AOL) and deducts obj.ExclusiveOutput from AOL.ExclusiveCount. Step 1221, which replaces step 771, inserts obj into the AOL (if obj is not in the AOL) and adds obj.ExclusiveOutput to AOL.ExclusiveCount.

The XPSRM allows multiple objects to be added to a display list, but provides that only some explicitly specified objects appear. A render task that utilizes an XPSRM is called an XPSRT.

Figure 11A:
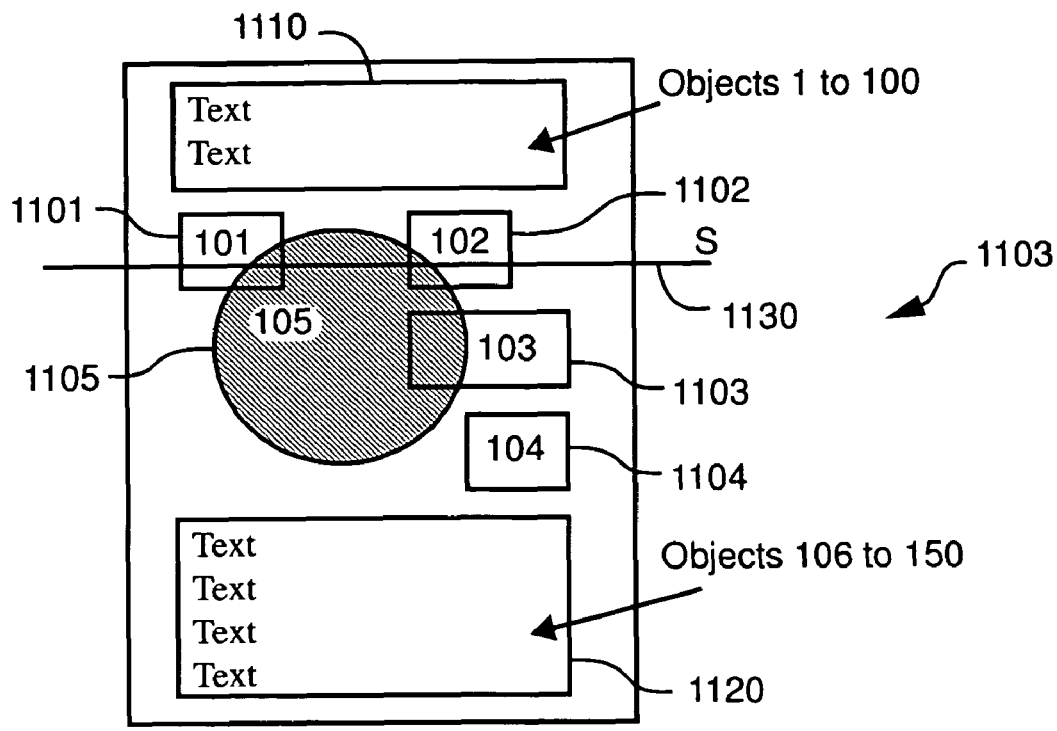
FIG. 11A shows a schematic representation of a page of objects.

An example is shown in FIG. 11A. Image 1100 contains one hundred first objects in region 1110. The first hundred objects are opaque text objects. Image 1100 also includes five vector graphic objects, 1101, 1102, 1103, 1104 and 1105 where object 1105 composites onto objects 1101, 1102 and 1103. These objects are then followed by a further number of text objects in region 1120. In the methods of the first and second arrangements described above, all objects between the first text object and object 1105 will be rendered using a PSRM because object 1105 is the last compositing object, even though object 1105 has no effect on region 1110.

Figure 11B:
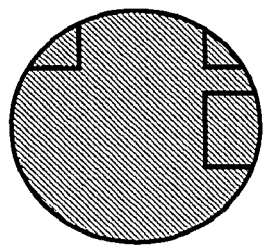
FIG. 11B shows an object of FIG. 11A rendered using an Exclusive Pixel Sequential Render Method (XPSRM)

In contrast, using an XPSRM, object 1105 may be exclusively rendered to the framestore, such that only object 1105 is output, but object 1105 is also composited against objects 1101, 1102, and 1103, as seen in FIG. 11B.

Figure 11C:
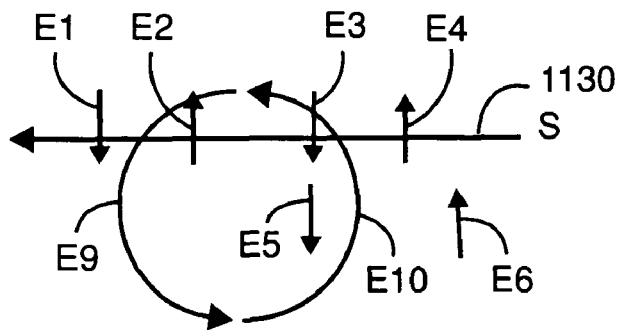
FIG. 11C shows the edges of objects of FIG. 11A that lie near a scanline S.

The ExclusiveOutput member of object 1105 is set to 1, ensuring that the XPSRT only outputs pixel runs when object 1105 is active. For such pixel runs, the edges of objects 1101, 1102, 1103 and 1105 are submitted to the XPSRT. The edges of object 1101 are E1 and E2, the edges of object 1102 are E3 and E4, the edges of object 1103 are E5 and E6 and the edges of object 1105 are E9 and E10. The edges are shown in FIG. 11C in relation to scanline 1130. The edges passed to the XPSRT are thus {E1, E2, E3, E4, E5, E6, E9, E10}. E7 and E8 belong to object 1104, and are thus not included in the edges to be rendered.

The edge list is sorted, resulting in the list {E1, E2, E3, E4, E9, E10, E5, E6}, and edges are tracked normally as in FIG. 2 and FIG. 3A.

For scanline 1130, the active edge list is {E1, E9, E2, E3, E10, E4}. Referring to FIG. 3A, FIG. 12, and FIG. 13, at step 351, CurX is set to 0 and the ActiveObjectList is set to the empty list. At step 353, E1 is read. E1.X is>CurX so execution proceeds to step 357. N is set to E1.X, and at step 361, execution proceeds to step 1301. The AOL is empty, so no pixels are output and at step 471, execution returns to step 363. CurX is updated to E1.X, and at step 363 E1.X is not equal to PageWidth, so the routine returns to step 353.

At step 353, E1 is read. E1.X is=CurX so execution proceeds to step 359, which removes E1 from the AEL and calls step 751 of FIG. 12. In step 751 i is set to 0 and clip_delta is set to 0. At step 753, obj is set to E1.OL[0]=1101. At step 755, object 1101 is not a clip, so at step 768, obj.ClipCount is incremented by zero. At step 769, the object has become active and at step 1221, the object is inserted into the AOL, and AOL.ExclusiveCount is incremented by 1101. ExclusiveCount, which is zero. At step 763, i is incremented by one and since all objects are processed at step 765, the routine ends at step 767. Then, in step 360, edge E1.X is updated for the next scanline. Execution returns to step 353.

Table D summarizes the key steps and actions that take place.

9.0 Third Arrangement: Rendering Using XPSRM and IPARM

A third rendering arrangement uses both the exclusive pixel sequential rendering method (XPSRM) described above and the improved Painter's Algorithm rendering method (IPARM).

9.1 Third Arrangement: Generating the Display List

In the third arrangement, the display list generation module 1507 generates the display list using the method of FIG. 9, with a modification to step 905.

To step 905 is added the logic that if the object requires compositing, a new entry is added to a third list called the compositing list. The modification to step 905 is summarized in the following pseudo code:

```
If object.Clip <> CurClip
    Decompose object.Clip into edges and level data
    Add edges to edge list
ENDIF
Decompose object into edges, level data, fill data.
Add edges to edge list.
IF Object requires compositing
    SET composites = TRUE
    SET last-compositing-object = i
    Add new entry to compositing list CL
    SET OL[i].CompositeIndex = "size-of CL" - 1
    SET OL[i].ExclusiveOutput = 1
ELSE
    SET composites = FALSE
ENDIF
```

Each entry in the compositing list is a list of objects, where the first entry is the compositing object itself, followed by all objects beneath the compositing object, where "beneath" means "lower priority and overlapping by bounding box". The compositing list is in ascending priority order, so the last object in the compositing list is the highest-priority object in Z-order beneath the compositing object. The list of objects dependent on each compositing object is constructed during the rendering process by the rendering module 1511. Although this description is in terms of lists, alternative data structures such as trees may also be used to capture the same information.

The output from the modified method of FIGS. 9(a) and 9(b) is:
- an unsorted main edge list;
- a corresponding object list; and
- a compositing list.

In addition, the last-compositing-object has been identified, and the total number of objects in the display list is the value of the counter "i".

Then, during rendering, as each object is processed from first to last in the object list, the object's bounding box is checked against all entries in the compositing list. If the bounding box of a currently-considered object overlaps with a compositing object's bounding box, then the currently-considered object is added to the corresponding entry in the compositing list.

In the example of FIG. 11A, the compositing list generated in the third arrangement contains one entry. The entry in turn consists of four objects, {1105, 1101, 1102, 1103}.

9.2 Third Arrangement: Rendering

Figure 17:
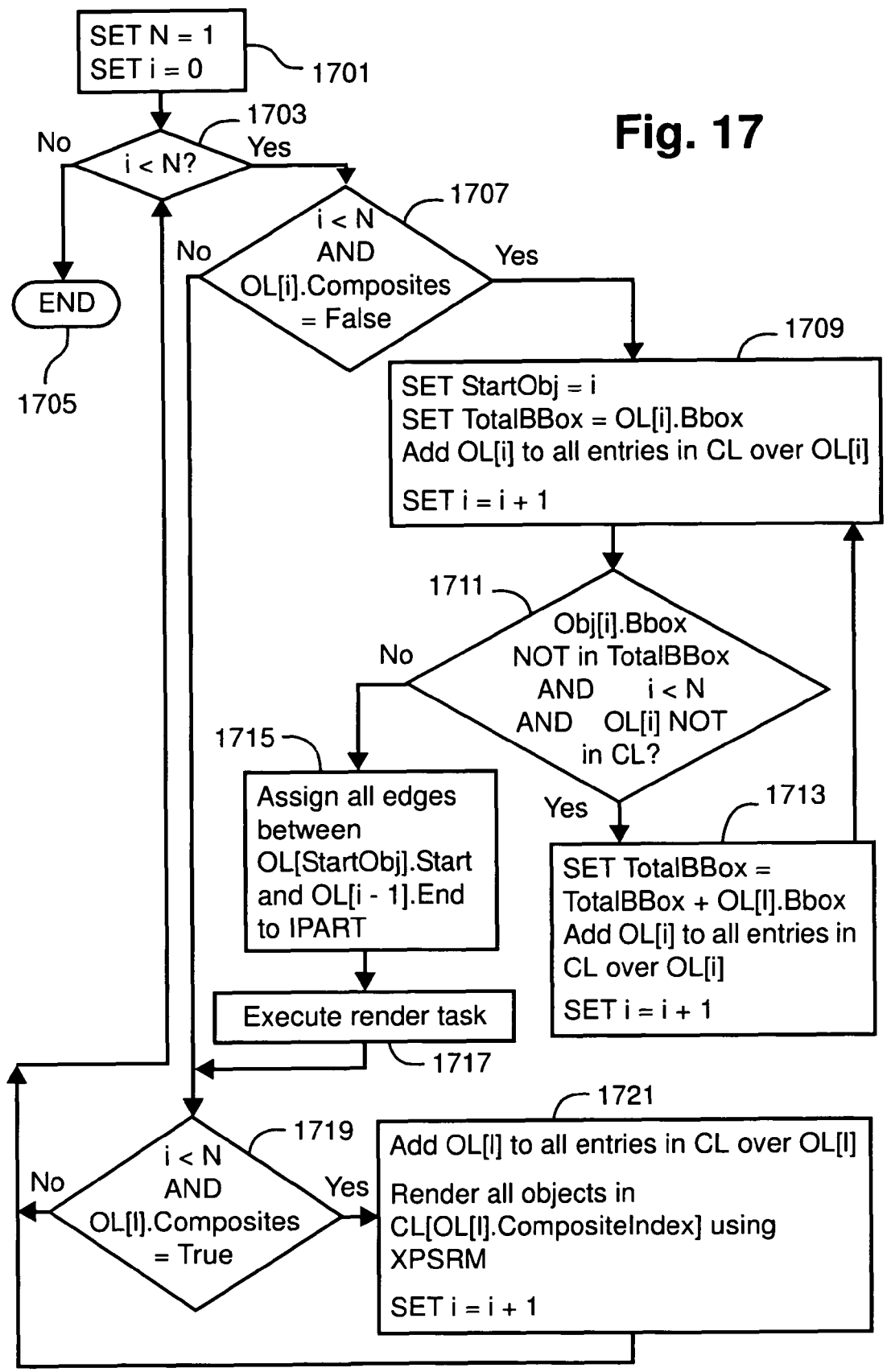
FIG. 17 is a flowchart of a third rendering arrangement that uses an exclusive pixel sequential rendering method and an improved Painter's Algorithm render method (XPSRM and IPARM)

The rendering method of the third arrangement is shown in FIG. 17. In the initialization step 1701, the rendering module 1511 sets index i to zero and sets N to the total number of objects in the display list. Then step 1703 checks whether index i is less than N. If this is not the case, the rendering process terminates in step 1705.

If i is less than N (the YES option of step 1703), then execution proceeds to step 1707, which checks whether i<N and OL[i].Composites=FALSE. If these conditions are satisfied (the YES option of step 1707) then in step 1709 module 1511 sets the following values:

StartObj=i

TotalBBox=OL[i].Bbox i=i+1

Step 1709 also adds entry i to all entries in the compositing list CL that are over i, based on bounding boxes and priority.

Next, step 1711 checks three conditions. If OL[i].Bbox is not in TotalBBox and i<N and OL[i] is not in the compositing list CL, then execution proceeds to step 1713. Otherwise (the NO option of step 1711), execution proceeds to step 1715.

In step 1713, the rendering module 1511 adds the bounding box of the current object OL[i] to the total bounding box TotalBBox, and increments i. Step 1713 then adds OL[i] to all entries in the compositing list CL over OL[i]. Execution then returns to step 1711 to process the next object.

In step 1715, the rendering module 1511 assigns all edges between OL[StartObj].Start and OL[i−1].End to an IPART. Then, in step 1717, the render task is executed, using the method steps of FIGS. 2, 3A, 7 and 8. Process flow then continues in step 1719. Step 1719 is also executed if the conditions in step 1707 are not satisfied (the NO option of step 1707).

Step 1719 checks whether i is less than N and whether OL[i].Composites is TRUE. If these conditions are not satisfied, execution returns to step 1703. If the conditions are satisfied (the YES option of step 1719) then in step 1721 the renderer 1511 adds the current object OL[i] to all entries in the compositing list CL that are over OL[i]. The renderer then renders all objects in CL[OL[i].CompositeIndex] using an XPSRM (method steps of FIGS. 2, 3A, 12 and 13). Index i is incremented and execution returns to step 1703 to consider the next object.

The method of FIG. 17 is also described by the following pseudo-code:

```
1.  SET N = 1
2.  SET i = 0
3.  WHILE i < N
4.      WHILE i < N AND OL[i].Composites = FALSE
5.          SET StartObj = i
6.          SET TotalBBox = OL[i].BBox
7.          Add entry i to all entries in CL that are over object i
            (based on
                    bounding boxes and priority)
8.          i = i + 1
9.          WHILE OL[i].BBox NOT IN TotalBBox AND i < N, AND
            object i not in CL
10.             SET TotalBBox = TotalBBox + OL[i].BBox
11.             Add object i to all entries in CL that are over i
                (based on bounding boxes and priority)
12.             i = i + 1
13.         ENDWHILE
14.         Render ALL objects between StartObj and i–1 using IPARM
15.     ENDWHILE
16.     IF i < N AND OL[i].Composites = TRUE
17.         Add entry i to all entries in CL that are over i (based
            on
                    bounding boxes and priority)
18.         Render all objects in CL[OL[i].CompositeIndex] + OL[i]
                using XPSRM.
19.         i = i + 1
19.     ENDIF
20. ENDWHILE
```

In the example of FIG. 11A, the object list consists of the objects:

O1, . . . , O100, O101, O102, O103, O104, O105, O106, . . . , O150, where O1-O100 are the text objects 1110, objects O101-O105 are the vector graphic objects 1101-1105 and objects O106-O150 are the text objects 1120.

The compositing list is CL[0]=O105. The compositing list is determined by the display list generation module 1507.

During rendering, since objects O1 to O100 do not overlap CL[0] by bounding box and are all less than CL[0] by priority, each object O1-O100 is rendered using one or more IPARMs.

Then between lines 4 and 15 of the pseudo-code, the following work is performed by the renderer 1511:

Line 7: O101 is less than CL[0] by priority and overlaps CL[0] by bounding box, so O101 is added to CL[0].

Line 11: O102 is less than CL[0] by priority and overlaps CL[0] by bounding box, so O102 is added to CL[0].

Line 11: O103 is less than CL[0] by priority and overlaps CL[0] by bounding box, so O103 is added to CL[0].

Line 11: O104 is less than CL[0] by priority but does not overlap CL[0] by bounding box so O104 is not added to CL[0].

Line 9: O105 is a compositing object so the loop terminates.

Line 14: Objects O101, 102, 103 and 104 are rendered to the framestore using an IPARM.

Line 4: O105 is a compositing object so the loop terminates.

Line 16, OL[i]=O105, which has O105. Composite=TRUE.

Line 17: Since there are no entries in compositing list CL with higher priority than O105, execution proceeds to Line 18.

Line 18: The entries in CL[0] are O105, O101, O102, O103. So the objects O101, O102, O103 and O105 are assigned to the XPSRT and rendered to the framestore.

Line 3: i=106. and between lines 4 and 15, all further objects 1120 are rendered using one or more IPARMs.

10.0 Further Arrangements

In a further variation of all three arrangements, it can be seen that during rendering, once a render task has begun, a further render task can be at least identified while the current render task is executing. If a next identified render task has a bounding box that does not overlap a currently executing render task, then the next identified render task can also begin rendering. This process can continue until either a next identified render task has a bounding box overlapping currently executing render tasks, or rendering is completed.

INDUSTRIAL APPLICABILITY

It is apparent from the above that the arrangements described are applicable to the computer and image processing industries.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

TABLE A

Applying the method of FIG. 2 to the example of FIG. 1

| 253 | 255 | 257 | 259 |
|---|---|---|---|
| Read E1 from Edge list | E1.Y > CurY | Set N = E1.Y – CurY. Render AEL { } for N scanlines Set CurY = E1.Y | |
| Read E1 from edge list | E1.Y = CurY | | Remove E1 from main edge list and Merge E1 into active edge list. AEL = {E1}. |
| Read E2 from edge list | E2.Y = CurY | | Remove E2 from main edge list and Merge E2 into active edge list. AEL = {E1, E2} |

TABLE A-continued

Applying the method of FIG. 2 to the example of FIG. 1

| 253 | 255 | 257 | 259 |
|---|---|---|---|
| Read E5 from edge list | E5.Y > CurY | Set N = E5.Y − CurY Render AEL = {E1, E2} for N scanlines. Set CurY = E5.Y | |
| Read E5 from edge list | E5.Y = CurY | | Remove E5 from main edge list and Merge E5 into active edge list. AEL = {E5, E1, E2} |
| Read E6 from edge list. | E6.Y = CurY | | Remove E6 from main edge list and Merge E6 into active edge list. AEL = {E5, E1, E2, E6} |
| Read E3 from edge list. | E3.Y > CurY | Set N = E3.Y − CurY Render AEL = {E5, E1, E2, E6} for N scanlines. Set CurY = E3.Y | |
| Read E3 from edge list. | E3.Y = CurY | | Remove E3 from main edge list and Merge E3 into active edge list. AEL = {E5, E1, E3, E2, E6} |
| Read E4 from edge list. | E4.Y = CurY | | Remove E4 from main edge list and Merge E4 into active edge list. AEL = {E5, E1, E3, E4, E2, E6} |
| Read edge list, | All edges processed. | Set N = PageHeight − CurY. Render AEL = {E5, E1, E3, E4, E2, E6} for N scanlines. | |

TABLE B

Applying the method of FIG. 3A to a scanline of FIG. 1A

| 353 | 355 | 357/361/363 | 359/360 |
|---|---|---|---|
| Read edge E5 | E5.X > CurX | Set N = E5.X − CurX. Render AOL { } for N pixels. Set CurX = E5.X | |
| Read edge E5 | E5.X = CurX | | Remove E5 from AEL. Activate object pointed to by E5: O2. AOL = {O2} Update edge E5.X for the next scanline. Add E5 to TempAEL. |
| Read edge E1 | E1.X > CurX | Set N = E1.X − CurX. Render AOL {O2} for N pixels. Set CurX = E1.X | |
| Read edge E1 | E1.X = CurX | | Remove E1 from AEL. Activate object pointed to by E1: O1. AOL = {O1, O2} Update edge E1.X for the next scanline. Add E1 to TempAEL. |
| Read edge E3 | E3.X > CurX | Set N = E3.X − CurX. Render AOL {O1, O2} for N pixels. Set CurX = E3.X | |
| Read edge E3 | E3.X = CurX | | Remove E3 from AEL. Deactivate object pointed to by E3: O1. AOL = {O2} Update edge E3.X for the next scanline. Add E3 to TempAEL. |

TABLE B-continued

Applying the method of FIG. 3A to a scanline of FIG. 1A

| 353 | 355 | 357/361/363 | 359/360 |
|---|---|---|---|
| Read edge E4 | E4.X > CurX | Set N = E4.X − CurX. Render AOL {O2} for N pixels. Set CurX = E4.X | |
| Read edge E4 | E4.X = CurX | | Remove E4 from AEL. Activate object pointed to by E4: O1. AOL = {O1, O2} Update edge E4.X for the next scanline. Add E4 to TempAEL. |
| Read edge E2 | E2.X > CurX | Set N = E2.X − CurX. Render AOL {O1, O2} for N pixels. Set CurX = E2.X | |
| Read edge E2 | E2.X = CurX | | Remove E2 from AEL. Deactivate object pointed to by E2: O1. AOL = {O2} Update edge E2.X for the next scanline. Add E2 to TempAEL. |
| Read edge E6 | E6.X > CurX | Set N = E6.X − CurX. Render AOL {O2 } for N pixels. Set CurX = E6.X | |
| Read edge E6 | E6.X = CurX | | Remove E6 from AEL. Deactivate object pointed to by E6: O2. AOL = { } Update edge E6.X for the next scanline. Add E6 to TempAEL. |
| Read edge returns { } | All edges processed | Set N = PageWidth − CurX. Render AOL { } for N pixels. | |

TABLE C

Application of method of FIG. 7 to the first three edges of scanline 662

The active-edge list (AEL) for scanline 662 is: {E5, E1, E3, E4, E2, E6}.
The first edge E5 is processed as follows:
At step 751, counter i is initialized to zero, and variable clip_delta is initialized to 0.

| 753 | SET obj = E5.OL[0] = rectangle 654 |
| 755 | obj is not clip. |
| 768 | obj.ClipCount = 2 + 0 = 2. |
| 769 | obj.ClipCount <> 0 so go to 773. |
| 773 | obj not in AOL |
| 763 | SET i = 1 |
| 765 | All objects processed |
| 767 | End |

The second edge, E1, is processed as follows:
At step 751, counter i is initialized to zero, and variable clip_delta is initialized to 0.

| 753 | SET obj = E1.OL[0] = clip 650 |
| 755 | obj is clip. |
| 757 | Clip has become active |
| 761 | SET clip_delta = −1 |
| 763 | SET i = 1 |
| 765 | Not all objects processed in E5's object list. |
| 753 | SET obj = E5.OL[1] = rectangle 654 |
| 755 | obj is not clip. |
| 768 | obj.ClipCount = 2 + (−1) = 1. |
| 719 | obj.ClipCount <> 0, so go to 773. |
| 773 | obj not in AOL |
| 763 | SET i = 2 |

TABLE C-continued

Application of method of FIG. 7 to the first three edges of scanline 662

| 765 | All objects processed |
| 767 | End |

The objects associated with E3 are processed as follows:
At step 751, counter i is initialized to zero, and variable clip_delta is initialized to 0.

| 753 | SET obj = E3.OL[0] = clip 652 |
| 755 | obj is clip. |
| 757 | Clip has become active |
| 761 | SET clip_delta = −1 |
| 763 | SET i = 1 |
| 765 | Not all objects processed in E3's object list. |
| 753 | SET obj = E3.OL[1] = rectangle 654 |
| 755 | obj is not clip. |
| 768 | obj.ClipCount = 1 + (−1) = 0. |
| 769 | obj.ClipCount = 0 and obj is active, so go to 771. |
| 771 | Insert obj into AOL. |
| 763 | SET i = 2 |
| 765 | All objects processed |
| 767 | End |

At this point, the AOL contains object rectangle 654. The pixel run between E3 can now be output, consisting of the pixel data stored in fill F3.

TABLE D

Application of the third arrangement to scanline 1130 of FIG. 11

| 353 Read Edge | 357 Identify pixel run | 361/1301 Output | 359/751 Process levels | 363 Update CurX |
|---|---|---|---|---|
| E1 | 0–E1.x | AOL = { }. Nothing output between [CurX, E1.x] | Activate object 1101. | CurX = E1.x |
| E9 | E1.x–E9.x | AOL = {1101} AOL.ExclusiveCount = 0 Nothing output between [CurX, E9.x] | Activate object 1105. Increment AOL.ExclusiveCount | CurX = E9.x |
| E2 | E9.x–E2.x | AOL = {1101, 1105} AOL.ExclusiveCount = 1 Output composited pixel run of 1101 + 1105 | Deactivate 1101. | CurX = E2.x |
| E3 | E2.x–E3.x | AOL = {1105 } AOL.ExclusiveCount = 1 Output composited pixel run of 1105 | Activate object 1102 | CurX = E3.x |
| E10 | E3.x–E10.x | AOL = {1102, 1105} AOL.ExclusiveCount = 1 Output composited pixel run of 1102 + 1105 | Deactivate 1105 Decrement AOL.ExclusiveCount | CurX = E10.x |
| E4 | E10.x–E4.x | AOL = {1102} AOL.ExclusiveCount = 0 Nothing output between [CurX, E4.X] | Deactivate 1102. | CurX = E4.x |
| End | | | | |

The claims defining the invention are as follows:

1. A computer-implemented method of forming an image described by data represented as graphical objects, the computer comprising at least a processor configured for executing the method and an image store, the method comprising the steps of:
   (a) receiving a list of objects describing the image, in which at least one of the objects is to be composited and at least one of the objects is not to be composited, wherein the objects are ordered in priority order from a lowest-priority object to a highest-priority object;
   (b) considering objects in the list in order of increasing priority and, for each currently-considered object:
   (ba) rendering the currently-considered object to the image store using an object sequential rendering method if the currently-considered object is not to be composited, the respective objects being rendered by the object sequential rendering method to the image store in sequence independently; and
   (bb) if the currently-considered object is to be composited, performing the steps of:
      (bb)(i) determining objects in the list having lower priority than the currently-considered object and having a bounding box that overlaps a bounding box of the currently-considered object; and
      (bb)(ii) rendering each pixel of a portion of the currently-considered object and the determined objects in sequence of a raster scan order using a pixel sequential rendering method if the portion of an object contributes to a rendered output of a set of objects processed by the pixel sequential rendering method, wherein
   the steps are performed on a computer.

2. A method according to claim 1 wherein the object sequential rendering method further comprises the sub-steps of
   searching for a group of consecutive objects in the second set of objects such that objects in the group do not overlap other objects in the group; and
   if the group is found, rendering the objects in the group concurrently into the image store.

3. A method according to claim 2 wherein a maximum extent of each object is denoted by a bounding box and wherein the bounding boxes of objects in the group do not overlap the bounding boxes of other objects in the group.

4. A method according to claim 1 wherein, if a plurality of consecutive objects in the second set of objects are clipped by a clip object, the plurality of objects is rendered using the pixel sequential rendering method.

5. A method according to claim 1 further comprising the step of:
   generating the list of objects, wherein for each object the list comprises:
   a set of one or more edges describing the object;
   a bounding box indicating a maximum extent of the object; and
   a flag to indicate whether the object is to be composited.

6. A method according to claim 5 wherein, if a group of consecutive objects, arranged in rendering priority order, is clipped by one or more clip objects, edges between a first of the clip objects and a last of the group of objects being clipped are added to the list as a single object.

7. A method according to claim 1 wherein those portions of the determined objects lying within the edges of the current object are placed in the first set of objects to be composited.

8. A method according to claim 1 wherein the image store is a band store that stores a currently-considered portion of the image, and wherein the pixel sequential and object sequential rendering methods render objects that are present in the currently-considered portion of the image.

9. A method according to claim 1 wherein step (bb)(ii) renders areas of the determined objects that lie within edges of the currently-considered object.

10. A method according to claim 1, wherein the pixel sequential rendering method generates a color and an opacity for a currently considered pixel in raster scan order, wherein a plurality of contributing active objects are composited and written to the image store.

11. A method according to claim 1, wherein the object sequential rendering method renders an object when the object is received, wherein compositing is performed between the object and the image store.

12. A computer-implemented method of rendering an object-based image, the computer comprising at least a processor configured for executing the method and an image store, the method comprising the steps of:
   receiving a list of objects in the image in priority order from a lowest-priority object to a highest-priority object;
   assigning objects in the list to at least one set of objects, wherein objects in the set have consecutive priority orders in the list and wherein each object in the set does not overlap any other object in the set; and
   rendering the at least one set of objects to the image store by either;
      rendering the objects that are to be composited using a pixel sequential render method, or
      rendering the objects that are not to be composited in sequence, wherein
   the steps are performed on a computer.

13. A method according to claim 12 wherein the list has a last-composing object that is the highest-priority object to be composited and wherein said assigning step considers objects in the list having a priority higher than the last-compositing object, the method further comprising the step of:
   rendering objects in the list from the lowest-priority object to the last compositing object using a pixel sequential rendering method of rendering each pixel of a portion of an object that contributes to a rendered output of the objects in the list in sequence of a raster scan order.

14. An apparatus for rendering an object-based image, the apparatus comprising:
   an image store and a processor, said processor comprising:
   first means for rendering each pixel of a portion of an object which is to be composited in sequence of a raster scan order to said image store using a pixel sequence rendering method that determines whether a portion of an object contributes to a rendered output of a set of objects processed by said first means;
   second means for rendering objects that are not to be composited using an object sequential rendering method that renders each object received by said second means to said image store in sequence independently;
   means for receiving a list of objects in the image, wherein the objects are ordered in priority order from a lowest-priority object to a highest-priority object;
   means for determining, for an object that is to be composited, objects in the list that have a lower priority than the compositing object and that have a bounding box that overlaps a bounding box of the compositing object;
   means for assigning non-compositing objects from the list to said second means for rendering; and
   means for assigning compositing objects from the list of said first means for rendering, together with the objects determined for each compositing object by said means for determining.

15. An apparatus according to claim 14 wherein said means for assigning assigns a plurality of objects concurrently to said second means for rendering, and wherein said plurality of objects do not overlap and have consecutive priority positions in the list.

16. An apparatus according to claim 14 comprising a plurality of said second means for rendering.

17. An apparatus for rendering an object-based image, the apparatus comprising:
   an image store and a processor, said processor comprising:
   means for receiving a list of objects in the image in priority order from a lowest-priority object to a highest-priority object;
   means for assigning objects in the list to at least one set of objects, wherein objects in the set have consecutively priority orders in the list and wherein each object in the set does not overlap any other object in the set; and
   means for rendering the at least one set of objects to said image store by either;
      rendering the objects that are to be composited using a pixel sequential render method; or
      rendering the objects that are not to be composited using an object sequential render method.

* * * * *